US012776983B2

(12) United States Patent
Kattepur et al.

(10) Patent No.: US 12,776,983 B2
(45) Date of Patent: Oct. 27, 2026

(54) RECONFIGURATION OF NODE OF FAT TREE NETWORK FOR DIFFERENTIATED SERVICES

(71) Applicant: TELEFONAKTIEBOLAGET LM ERICSSON (PUBL), Stockholm (SE)

(72) Inventors: Ajay Kattepur, Bangalore (IN); Sushanth S David, Frisco, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 130 days.

(21) Appl. No.: 18/718,261

(22) PCT Filed: Dec. 10, 2021

(86) PCT No.: PCT/SE2021/051234
§ 371 (c)(1),
(2) Date: Jun. 10, 2024

(87) PCT Pub. No.: WO2023/106981
PCT Pub. Date: Jun. 15, 2023

(65) Prior Publication Data
US 2025/0055790 A1 Feb. 13, 2025

(51) Int. Cl.
*H04L 45/484* (2022.01)
*H04L 41/16* (2022.01)
*H04W 28/02* (2009.01)

(52) U.S. Cl.
CPC ............ *H04L 45/484* (2022.05); *H04L 41/16* (2013.01); *H04W 28/02* (2013.01)

(58) Field of Classification Search
CPC ... H04L 45/484; H04L 41/16; H04L 41/0823; H04L 45/08; H04L 45/125; H04L 45/14;
(Continued)

(56) References Cited

U.S. PATENT DOCUMENTS 9,210,048 B1 * 12/2015 Marr ........................ H04L 47/70
11,328,222 B1 * 5/2022 Matthews ............... H04L 47/32
(Continued)

FOREIGN PATENT DOCUMENTS

| | | | |
|---|---|---|---|
| EP | 3840328 | A1 | 6/2021 |
| WO | 2019204107 | A1 | 10/2019 |
| WO | 2020190677 | A1 | 9/2020 |

OTHER PUBLICATIONS

Kattepur, A. et al.; "MALTA: Multi-Agent Reinforcement Learning for Differentiated Services in Fat Tree Networks"; 2021 IEEE Conference on Network Function Virtualization and Software Defined Networks (NFV-SDN); Nov. 9, 2021; 6 pages.
(Continued)

*Primary Examiner* — Karen C Tang
(74) *Attorney, Agent, or Firm* — Sage Patent Group

(57) ABSTRACT

A method is provided that is performed by a first node of a fat tree network for management of a plurality of traffic flows having differentiated service requirements. The method includes receiving, from a simulation model or a testbed environment, joint observations for the traffic flows. The traffic flows correspond to routing paths comprising different combinations of at least one leaf node, at least one spine node, and at least one super spine node of the fat tree network per routing path. The method further includes identifying, with a first reinforcement learning model, a first action to take to reduce or prevent congestion at the first node. The first action includes a reconfiguration of the first node for an identified routing path. The method further includes outputting, to a controller node, the reconfiguration of the first node.

19 Claims, 17 Drawing Sheets

(58) Field of Classification Search
CPC ....... H04L 45/24; H04L 47/10; H04L 41/046; H04L 41/5025; H04L 41/145; H04L 41/147; H04L 41/40; H04L 43/08; H04W 28/02
See application file for complete search history.

(56) References Cited

U.S. PATENT DOCUMENTS

| | | | | |
|---|---|---|---|---|
| 2013/0100816 | A1* | 4/2013 | Bergamasco | H04L 47/25 370/237 |
| 2015/0180782 | A1* | 6/2015 | Rimmer | H04L 49/358 370/235 |
| 2016/0014049 | A1* | 1/2016 | Zahid | H04L 49/25 |
| 2016/0173199 | A1* | 6/2016 | Gupta | H04L 41/0803 398/127 |
| 2016/0359705 | A1* | 12/2016 | Parandehgheibi | H04L 43/0805 |
| 2017/0054524 | A1* | 2/2017 | Gumaste | H04B 10/032 |
| 2018/0212881 | A1* | 7/2018 | White | H04L 43/20 |
| 2018/0278496 | A1* | 9/2018 | Kulshreshtha | H04L 43/0852 |
| 2019/0190815 | A1 | 6/2019 | Thubert et al. | |
| 2020/0112487 | A1* | 4/2020 | Inamdar | H04L 67/14 |
| 2020/0169509 | A1* | 5/2020 | Tigli | H04L 47/2441 |
| 2020/0252300 | A1* | 8/2020 | Levy-Abegnoli | H04L 41/0813 |
| 2020/0259740 | A1* | 8/2020 | Wetterwald | H04L 45/302 |
| 2020/0259746 | A1* | 8/2020 | Thubert | H04L 47/2483 |
| 2020/0389417 | A1* | 12/2020 | Wetterwald | H04L 41/16 |

OTHER PUBLICATIONS

Bertoli, M. et al.; “Java Modelling Tools: an Open Source Suite for Queueing Network Modelling and Workload Analysis”; Third International Conference on the Quantitative Evaluation of Systems—(QEST’06), Riverside, CA, USA; Sep. 11-14, 2006; 2 pages.
Oliehoek, F. et al.; “The MADP Toolbox: An Open Source Library for Planning and Learning in (Multi-) Agent Systems”; Journal of Machine Learning Research 18 (2017); Aug. 2017; 5 pages.
Hopps, C. et al.; “Analysis of an Equal-Cost Multi-Path Algorithm”; NextHop Technologies; Nov. 2000, 8 pages.
International Search Report and Written Opinion mailed Jul. 1, 2022 for International Application No. PCT/SE2021/051234, 15 pages.

* cited by examiner

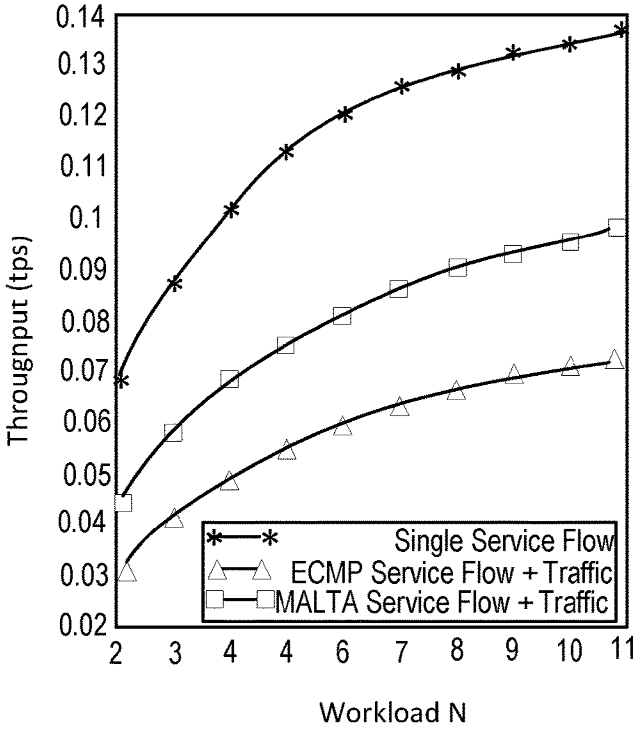
Figure 9A
Figure 9B
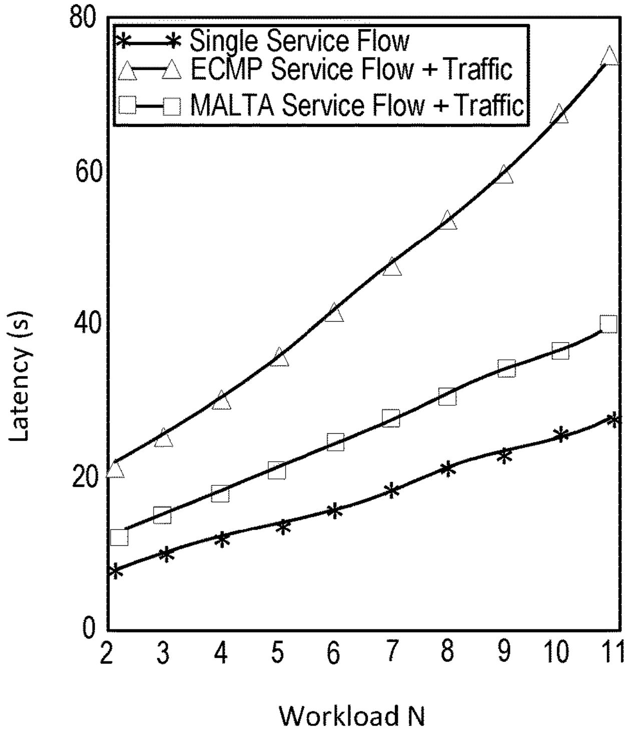

RECONFIGURATION OF NODE OF FAT TREE NETWORK FOR DIFFERENTIATED SERVICES

TECHNICAL FIELD

The present disclosure relates generally to methods for management of a plurality of traffic flows in a fat tree network having differentiated service requirements, and related methods and apparatuses.

BACKGROUND

Differentiated service requirements envisioned in fifth generation (5G) communications, e.g., enhanced Mobile Broadband communications (eMBB), Ultra Reliable Low Latency Communications (URLLC), and massive Machine Type Communications (mMTC) highlight a need for efficient traffic management. For example, to provide robust end-to-end guarantees and coexistence on shared network resources, network slicing has been proposed. For network slicing to perform effectively, however, packet processing and traffic shaping at a datacenter network core may need to be optimally configured.

In datacenter networks, three tiers (e.g., edge, aggregation and core) have been shown to be sub-optimal for large scale datacenter routing, with inefficient endpoint connections, low resilience to failure, and multiple congestion possibilities. To relive these effects, fat tree topologies have been proposed that interconnect various nodes (e.g., routers, switches, and end-point servers) within datacenters. In some approaches, in order to provide load balancing and traffic shaping, an Equal Cost Multi-path Routing (ECMP) protocol alone is used, where next-hop packet forwarding can occur over multiple "best paths" in routing metric calculations.

A virtualized datacenter is a highly multifarious environment, shared among many co-located tenants (e.g., hundreds) hosting heterogeneous applications. A high degree of virtual machine consolidation may lead to diverse traffic dynamics with uneven traffic demands. For example, tenants' virtual machines can generate a subset of elephant or mouse flows that traverse the underlay fabric in aggregate, e.g., encapsulated in tunnelling protocols such as a VXLAN encapsulation protocol, a network virtualization using generic routing encapsulation (NVGRE) protocol, and stateless transport tunnelling (STT) protocol.

SUMMARY

Certain aspects of the disclosure and their embodiments may provide solutions to these or other challenges.

Various embodiments of the present disclosure, provide a method performed by a first node of a fat tree network for management of a plurality of traffic flows in the fat tree network having differentiated service requirements. The method includes receiving, from a simulation model or a testbed environment, a plurality of joint observations for the plurality of traffic flows. The plurality of traffic flows correspond to a plurality of routing paths comprising different combinations of at least one leaf node, at least one spine node, and at least one super spine node of the fat tree network per routing path. The method further includes identifying, with a first reinforcement learning model for the first node, a first action to take to reduce or prevent congestion at the first node of a traffic flow based on a policy generated from at least the plurality of joint observations. The first action comprises a reconfiguration of the first node for an identified routing path. The method further includes outputting, to a controller node, the reconfiguration of the first node.

In some embodiments, the method further includes receiving, from the simulation model or the testbed environment, a plurality of global reward values. A global reward value indicates a measure of a joint state of the nodes in the fat tree network in a routing path comprising a combination of the at least one leaf node, the at least one spine node, and the at least one super spine node. The joint state results from an action of at least one reinforcement learning agent in the fat tree network for the routing path.

In other embodiments, a first node of a fat tree network is provided for management of a plurality of traffic flows in the fat tree network having differentiated service requirements. The first node includes at least one processor; and at least one memory connected to the at least one processor and storing program code that is executed by the at least one processor to perform operations. The operations include receive, from a simulation model or a testbed environment, a plurality of joint observations for the plurality of traffic flows. The plurality of traffic flows correspond to a plurality of routing paths comprising different combinations of at least one leaf node, at least one spine node, and at least one super spine node of the fat tree network per routing path. The operations further include identify, with a first reinforcement learning model for the first node, a first action to take to reduce or prevent congestion at the first node of a traffic flow based on a policy generated from at least the plurality of joint observations. The first action comprises a reconfiguration of the first node for an identified routing path. The operations further include outputting, to a controller node, the reconfiguration of the first node.

In other embodiments, a first node of a fat tree network is provided for management of a plurality of traffic flows in the fat tree network having differentiated service requirements, the first node adapted to per operations. The operations include receive, from a simulation model or a testbed environment, a plurality of joint observations for the plurality of traffic flows. The plurality of traffic flows correspond to a plurality of routing paths comprising different combinations of at least one leaf node, at least one spine node, and at least one super spine node of the fat tree network per routing path. The operations further include identify, with a first reinforcement learning model for the first node, a first action to take to reduce or prevent congestion at the first node of a traffic flow based on a policy generated from at least the plurality of joint observations. The first action comprises a reconfiguration of the first node for an identified routing path. The operations further include outputting, to a controller node, the reconfiguration of the first node.

In other embodiments, a computer program comprising program code to be executed by processing circuitry of a first node of a fat tree network is provided for management of a plurality of traffic flows in the fat tree network having differentiated service requirements. Execution of the program code causes the first node to perform operations. The operations include receive, from a simulation model or a testbed environment, a plurality of joint observations for the plurality of traffic flows. The plurality of traffic flows correspond to a plurality of routing paths comprising different combinations of at least one leaf node, at least one spine node, and at least one super spine node of the fat tree network per routing path. The operations further include identify, with a first reinforcement learning model for the first node, a first action to take to reduce or prevent congestion at the first node of a traffic flow based on a policy generated from at least the plurality of joint observations. The first action comprises a reconfiguration of the first node for an identified routing path. The operations further include outputting, to a controller node, the reconfiguration of the first node.

In other embodiments, a computer program product comprising a non-transitory storage medium including program code to be executed by processing circuitry of a first node of a fat tree network is provided for management of a plurality of traffic flows in the fat tree network having differentiated service requirements. Execution of the program code causes the first node to perform operations. The operations include receive, from a simulation model or a testbed environment, a plurality of joint observations for the plurality of traffic flows. The plurality of traffic flows correspond to a plurality of routing paths comprising different combinations of at least one leaf node, at least one spine node, and at least one super spine node of the fat tree network per routing path. The operations further include identify, with a first reinforcement learning model for the first node, a first action to take to reduce or prevent congestion at the first node of a traffic flow based on a policy generated from at least the plurality of joint observations. The first action comprises a reconfiguration of the first node for an identified routing path. The operations further include outputting, to a controller node, the reconfiguration of the first node.

Certain embodiments may provide one or more of the following technical advantages. By providing joint observations from a simulation model or testbed environment for the traffic flows corresponding to a plurality of routing paths that include different combinations of leaf, spine, and/or super spine nodes, reconfiguration of one or more nodes of fat tree networks may be provided to reduce or prevent congestion and provide differentiated services. In some embodiments, the joint observations are based on an action(s) of at least one additional reinforcement learning (RL) agent in the fat tree network. As a consequence of having multiple ("multi") RL agents, the method of the present disclosure may provide a scalable multi-agent RL formulation that can demonstrate congestions and bottlenecks in the fat tree network due to interaction between traffic flows having differentiated service requirements (e.g., elephant and mouse flows) that existing approaches (e.g., ECMP alone) do not resolve. For example, in a case study of the method of the present disclosure discussed further herein, a >30% improvement in throughput and latency over ECMP alone was demonstrated.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIGS. 9A and 9B are plots of utilization percentage and latency, respectively, for a routing path in accordance with some embodiments of the present disclosure;

DETAILED DESCRIPTION

Figure 1:
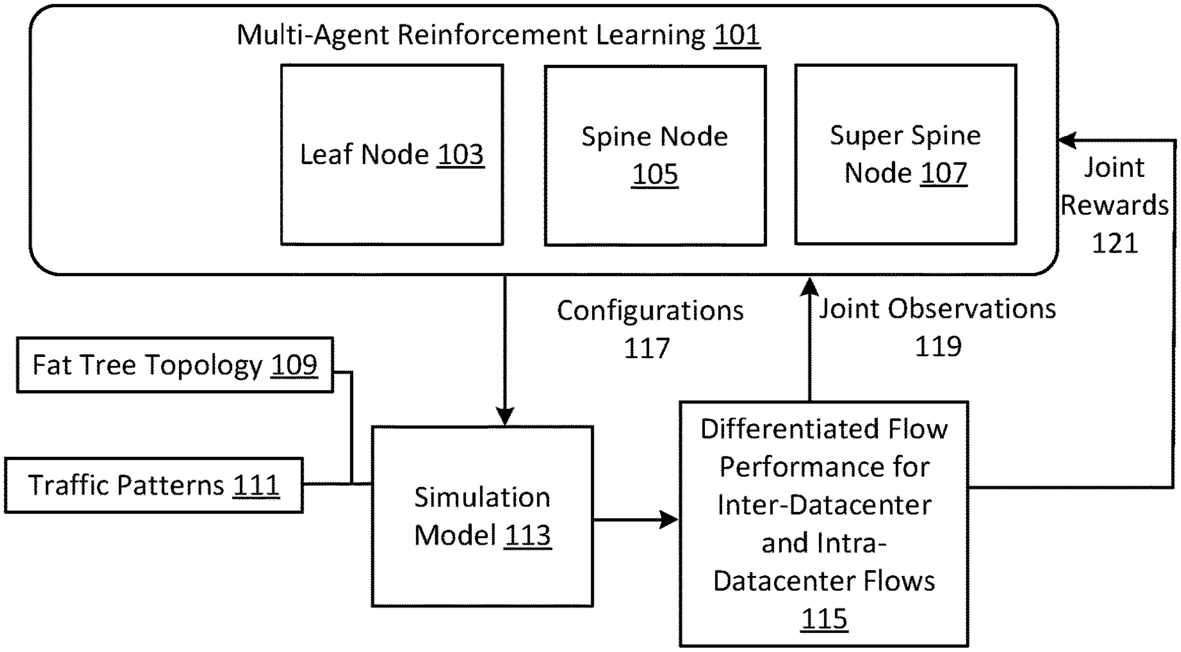
FIG. 1 is a diagram illustrating an overview of multi-agent RL in a fat tree network in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Potential problems exist with managing traffic flow in a fat tree network when the traffic flow includes traffic having differentiated service requirements. For example, an "elephant flow" refers to long-lived and bandwidth intensive traffic flow in comparison with "mouse flow", which refers to a shorter-lived less bandwidth intensive traffic flow. A mouse flow also may be latency-sensitive and highly bursty in nature. Both type of flows require different treatment from underlay fabric, but encapsulation can obfuscate the overlay traffic characteristics and demands.

Existing approaches such as ECMP alone have been employed in, e.g., data centers. Such approaches, however, may be either agnostic to elephant and mouse flows or may not have visibility into virtual traffic which may be used to precisely detect, isolate, and treat elephant flows differently than mouse flows. If elephant flows are not identified and addressed in aggregated virtual traffic, the elephant flows may affect mouse flows generated from co-located applications and, thus, degrade application performance of co-located tenants.

Such potential problems may be further affected by a dynamic mix of traffic flow among virtual machines within a datacenter (referred to herein as "East-West" traffic) and traffic flow that either enters/leaves a datacenter (referred to herein as "North-South" traffic). Traffic can skew towards a particular direction and, thus, monitoring, and optimal configuration may be needed. In addition, due to varying link capacities and problems of shallow buffers versus deep buffers, analysis of trade-offs between buffer size, latency, and packet drop rates may be needed.

Various embodiments of the present disclosure may provide potential technical advantages over such approaches by including multi-agent reinforcement learning (RL) processes (referred to herein as "MALTA") to configure a fat tree network(s). The RL agents can be intelligent and, in some embodiment, can be specifically developed over a Decentralized Partially Observable Markov Decision Process (Dec-POMDP) paradigm. Such Dec-POMDP agents can be used to dynamically reconfigure nodes (e.g., switches/routers) at leaf, spine, and/or super-spine level of the fat tree network, which may help ensure optimal network utilization. Side-effects of changing parameters at one level can be analyzed, which can result in coordinated behavior between agents. The method of various embodiments has been contrasted against, e.g., ECMP alone for a case study involving virtual network functions with a combination of elephant and mouse flows. As discussed further herein, in the case study, MALTA provided 46% latency improvement and 34% throughput improvement over ECMP.

Another potential advantage of various embodiments of the present disclosure may be that by providing joint observations from a simulation model or a testbed environment that considers analysis of multi-agent RL processes (e.g., dec-POMDP agents) for queue prioritization and traffic shaping of the traffic flows at the leaf, spine, and/or super spine node levels, superior differentiated services may result. For example, based on reconfiguration of a node(s) in a fat tree network for a datacenter, superior differentiated service performance may result.

FIG. 1 is a diagram illustrating an overview of multi-agent RL in a fat tree network in accordance with some embodiments of the present disclosure. Fat tree topology 109 identifies leaf, spine, and super spine nodes of the fat tree network. While FIG. 1 illustrates one leaf node, one spine node, and one super spine node, embodiments of the present disclosure are not so limited. Rather, the number of nodes in the leaf, spine, and super-spine levels can vary, and there can be varying fat-tree topologies. The fat tree topology also can have heterogeneous links to be incorporated within a simulation model 113 (also referred to herein as a "queueing network model"). Moreover, while embodiments herein are discussed with respect to a simulation model, embodiments of the present disclosure are not so limited. Instead of, or in addition to, a simulation model, a testbed environment can perform the functions described herein for a simulation model.

Still referring to FIG. 1, traffic patterns 111 includes Network Function Virtualization (NFV) traffic and flow intents to provide differentiated services (e.g., 5G differentiated services). For traffic management, a dynamic mix of North-South/East-West traffic with associated intents analysis of the patterns is included in simulation model 113.

Still referring to FIG. 1, simulation model 113 (e.g., a queueing network model) evaluates configuration changes. Inputs to simulation model 113 include fat tree topology 109 and traffic patterns 111. The evaluation of configuration changes by simulation model 113 allows configuration of, e.g., traffic flow priority, drop rates, routing schemes, and queueing policies at various links of the fat tree network. Inclusion of an simulation model (or a testbed environment) allows training of multi-agent RL learning 101 on various configurations that would not be possible on a live network. Additionally, similar simulation models or testbed environments can be replicated on other fat tree configurations.

Simulation model 113 outputs differentiated flow performance 115. For example, a combination of elephant and mouse flows in traffic patterns 111 results in differentiated service performance for each flow (e.g., for inter-datacenter flow versus intra-datacenter flow). A bottleneck at a particular node in the fat tree network can potentially affect the throughput, latency, and packet drop of each service. While techniques such as ECMP alone cannot handle differentiated service performance, as a consequence if multi-agent RL 101, the method of the present disclosure can handle differentiated service performance.

Still referring to FIG. 1, joint observations 119 from the simulation model 113 are used to train a multi-agent reinforcement learning 101 agents at the leaf node 103, spine node 105, and super spine node 107 levels of the fat tree network, respectively. In some embodiments, leaf agents at leaf nodes 103 are located close to server pods and can control L2/L3 switches with large buffers. The action space of leaf agents includes varying the flow priority and drop packets, and setting bandwidth for particular flows. In some embodiments, spine agents at spine nodes 105 can configure L3 switches that link the leaf and super-spine layers. The action space of spine agents includes ECMP or intelligent load balancing to route particular flows. In some embodiments, super spine agents at super spine nodes 107 can configure L3 switches that link the super-spine layers. The action space of super spine agents includes ECMP or intelligent load balancing to route particular flows. ECMP is discussed, e.g., in See e.g., C. Hopps, "Analysis of an Equal-Cost Multi-Path Algorithm", November 2000, https://datatracker.ietf.org/doc/html/rfc2992 (accessed on 15 Nov. 2021), which is hereby incorporated by reference in full.

Individual levels of agents at the leaf, spine, and super spine levels permits granular, level specific changes while aiding in scalable deployments. In some embodiments, output configurations 117 from the leaf, spine, and/or super spine agent nodes 103, 105, 107 is used as input to simulation model 113 to reconfigure the fat tree network and derive positive joint rewards 121 towards improvement of the system.

In some embodiments, the leaf, spine, and super spine agent nodes 103, 105, and/or 107 perform at least the following: (i) Identify variations in traffic patterns and take appropriate actions to prevent or reduce congestions as a result of interaction between different traffic flows, e.g., elephant and mouse flows; and (ii) Provide improved performance for differentiated services due to efficient setting of configurations at the leaf, spine, and super-spine levels.

Based on inclusion of reconfiguration of at least one leaf node 103, spine node 105, and/or super spine node 107, technical advantages provided by embodiments of the present disclosure may further include scalability to provide differentiated service to each flow, which is needed, for example, in 5G slicing. The combination of elephant and mouse flows can degrade performance, and in contrast with the method of the present disclosure can handle differentiated flow performance, conventional techniques (e.g., ECMP alone) cannot handle differentiated flow performance.

Figure 2:
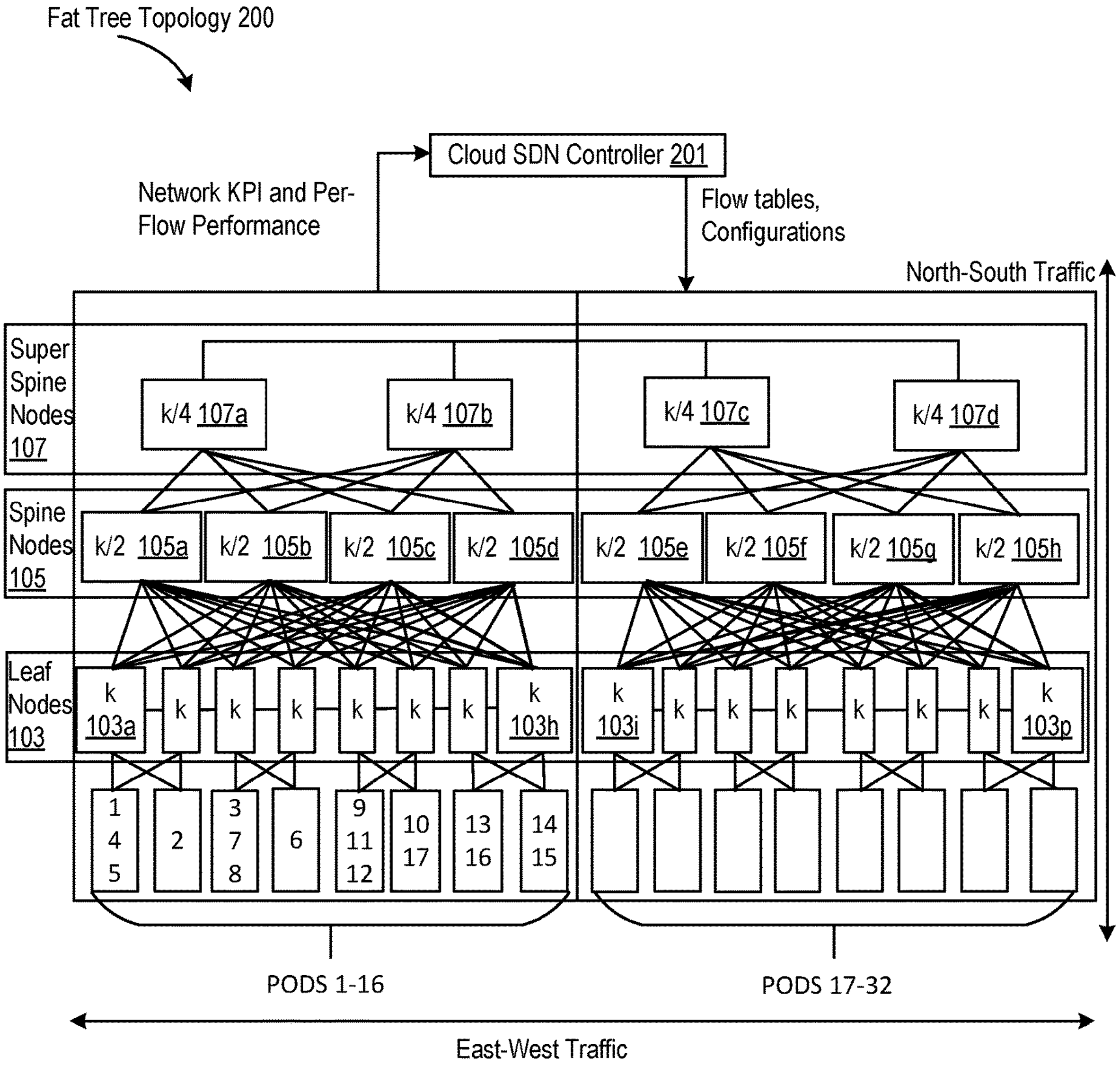
FIG. 2 is a schematic overview of an example fat three topology of a data center in accordance with some embodiments of the present disclosure.

Fat tree topology 109 will now be discussed further. FIG. 2 is a schematic overview of an example fat three topology in accordance with some embodiments of the present disclosure. Fat tree topology 200 is an example topology used in a datacenter and includes a leaf agent at leaf node 103, a pine agent at spine node 105, and a super spine agent at super spine node 107. Traffic flow among virtual machines within the datacenter of FIG. 2 is denoted as East-West traffic, and traffic flow that either enters or leaves the datacenter is denoted as North-South traffic. Cloud software defined networking (SDN) controller 201 provides traffic flow tables and configurations to fat tree topology 200, and receives from fat tree topology 200 network key performance indicators, KPIs, and per flow performance data. In the example topology of FIG. 2, pods 1-16 and 17-32 are located on k individual servers, k leaf switches (also referred to as "k leaf nodes") 103*a*-103*h* are connected to pods 1-16 and pods 17-32 as illustrated in FIG. 2. At the spine level, k/2 spine switches (also referred to herein as "spine nodes") 105*a*-105*h* are connected to each leaf node 103*a*-103*p*. At the super spine level, k/4 super-spine switches (also referred to herein as "super spine nodes") 107*a*-107*d* connected to each spine node 105*a*-105*h*. In the example embodiment of FIG. 2, between any source-destination pair nodes there are $(k/2)^2$ equal cost paths, with each layer having the same aggregated bandwidth.

Still referring to the example embodiment of FIG. 2, leaf nodes 103*a*-103*p*, spine nodes 105*a*-105*h*, and super-spine nodes 107*a*-107*d* have varying inter-link capacities. In this example, each leaf node 103-spine node 105 link is configured to 10 Gbps capacity, each spine node 105-super-spine node 107 link is configured to 40 Gbps capacity, and each inter super-spine node 107 link is configured to 100 Gbps capacity. While the example embodiment of FIG. 2 illustrates 16 leaf nodes 103, 8 super spine nodes 105, and 4 super spine nodes 107, fat tree networks of the present disclosure are not so limited and can include any number of nodes at each respective level. Additionally, based on the layers, the capacity of routers and switches at each level can be different (e.g., 4×, 10× chipsets). This difference can introduce network interface card speed mismatches and, thus, slowness in handling speed changes. In some existing approaches, ECMP techniques alone may be used to perform efficient load balancing, however, ECMP alone may be unable to match the requirements of all flows. For example, if elephant flows are not identified and addressed in aggregated virtual traffic, the elephant flow(s) may affect mouse flows generated from co-located applications, hence degrading application performance of co-located tenants.

Figure 3:
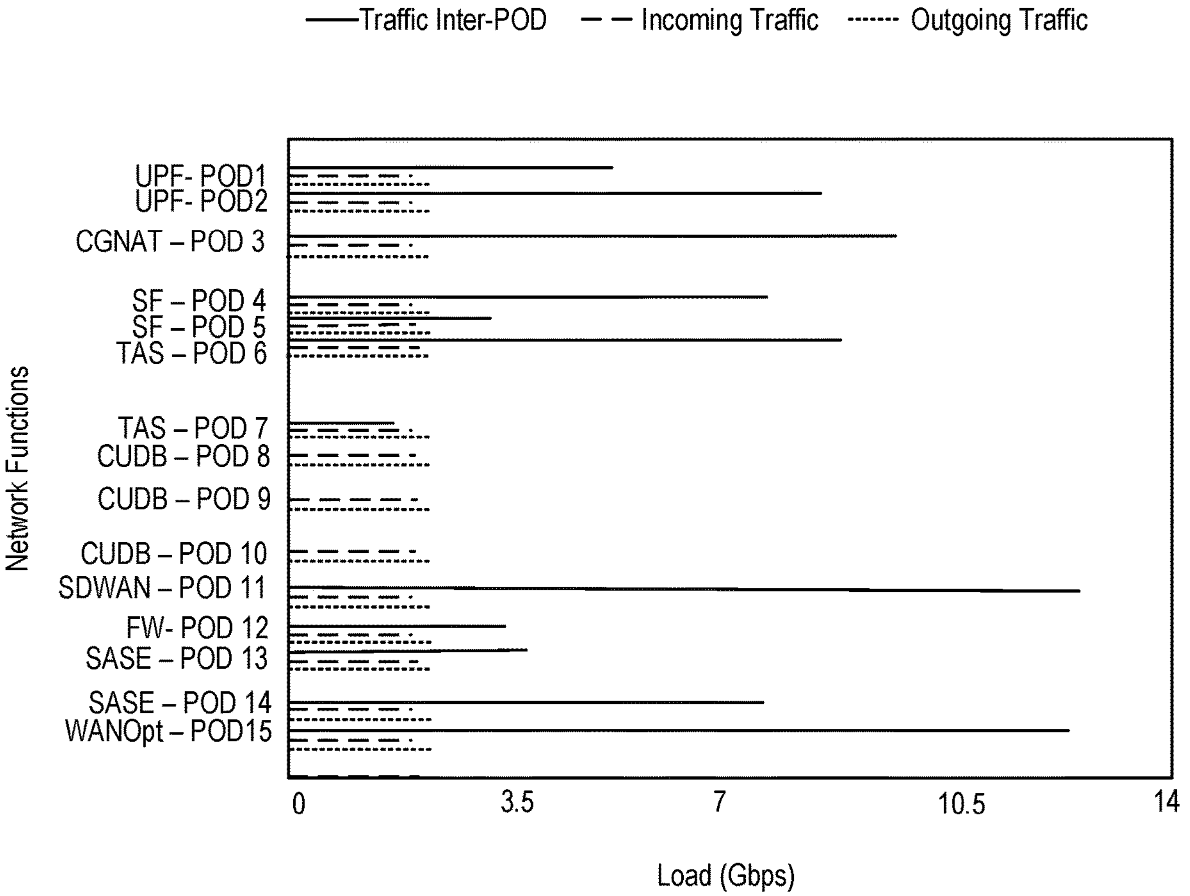
FIG. 3 is a plot illustrating East-West and North-South traffic in a network virtualized datacenter, such as the datacenter in FIG. 2.

FIG. 3 is a plot illustrating East-West and North-South traffic in a network virtualized datacenter, such as the datacenter in FIG. 2. East-West traffic flow among virtual machines within a datacenter is shown by the solid lines in FIG. 3, labelled "traffic Inter-POD". North-South traffic flow that either enters or leaves the datacenter is shown by the dashed and dotted lines in FIG. 3, labelled "incoming traffic" and "outgoing traffic", respectively. As illustrated in FIG. 3, the "traffic inter-POD" illustrate variations in traffic patterns including multiple traffic flows setup in between pods (e.g., Kubernetes pods). The illustrated traffic flows encompass traffic for the following functions: User Plane Function (UPF), carrier grand network address translation (CGNAT), security function (SF), telephony application server (TAS), centralized used data base (CUDB), software defined wide area network (SDWAN), firewall (FW), secure access service edge (SASE), wide area network optimizer (WANOpt). Long-horizon flows can be setup between the pods interspersed with shorter flows that are inter datacenter. To handle the differentiated service requirements of each flow, it is important (e.g., crucial) to characterize the appropriate setting of switches and routers at various layers of the fat tree topology 200. In accordance some embodiments, the reinforcement learning agents of the leaf node(s) 103, spine node(s) 105, and/or super-spine node(s) 107 configure such settings of the nodes (e.g., switches and routers) at the various levels (e.g., set priority, rates, and routes of flows).

Figure 4:
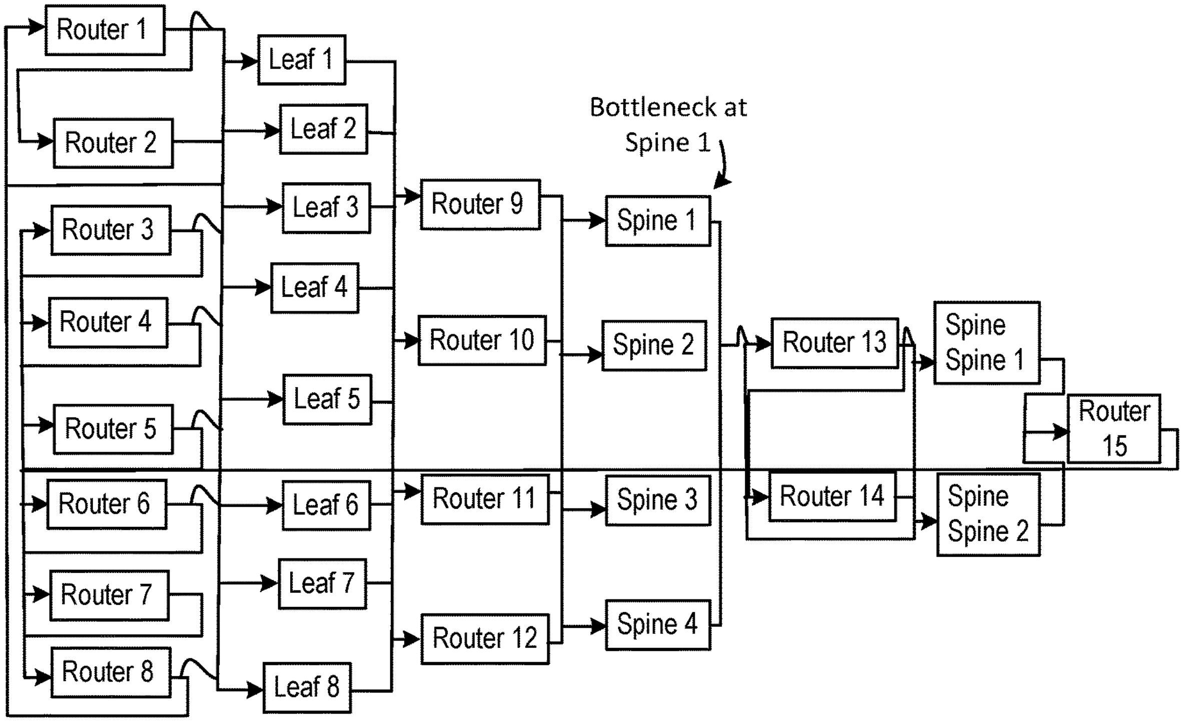
FIG. 4 is a schematic overview of an example embodiment of a queueing network model (also referred to herein as a "simulation model") in accordance with some embodiments of the present disclosure.

A simulation network (e.g., a queueing network model) of a fat tree network will now be discussed further. FIG. 4 is a schematic overview of an example embodiment of a queueing network model in accordance with some embodiments of the present disclosure. In some embodiments, a Java Modeling Tools (JMT) queueing network simulator can be used to model a fat tree network and study configuration changes. See e.g., Marco Bertoli, Giuliano Casale, Giuseppe Serazzi, "Java Modelling Tools: an Open Source Suite for Queueing Network Modelling and Workload Analysis", DOI 10.1109/QEST.2006.22 (2006), http://imt.sourceforge.net/Papers/gest06jmt.pdf (accessed on 15 Nov. 2021), which is hereby incorporated by reference in full. The example embodiment of FIG. 4 represents leaf nodes 1-8, spine nodes 1-4, and super-spine nodes 1 and 2 (e.g., switches, links, and interconnects, respectively) in JMT. Multiple classes of flows (e.g., flows for user datagram protocol (UDP), transmission control protocol (TCP), QUIC transport protocols) are included for simulation in the queueing network. In some embodiments, the simulation includes specifying priorities for processing each class of flows. Arrival rate of packets can be specified by a Poisson process with a service time (e.g., processing time per visit of a station).

The example queuing network model in FIG. 4 includes multiple routing sections that can be configured to algorithms such as round robin, random, load dependent, etc. Output measurements the queueing network model include, without limitation: (1) Residence time of a station (i.e., a node) corresponding to total time spent at a queuing station by a packet of a traffic flow; (2) Drop Rate of a station or of the entire fat tree network corresponding to a rate at which packets are dropped from a station or a region for the occurrence of a constraint (e.g., maximum capacity of a queue); (3) Throughput corresponding to a rate at which packets depart from the fat tree network, which can be described per each class of customers; and (4) Utilization of a station corresponding to a percentage of time a station is used (e.g., busy) evaluated over a simulation run. Utilization can range from 0 (e.g., 0%), when the station is always idle, to a maximum of 1 (e.g., 100%), when the station is constantly busy.

Figure 5A:
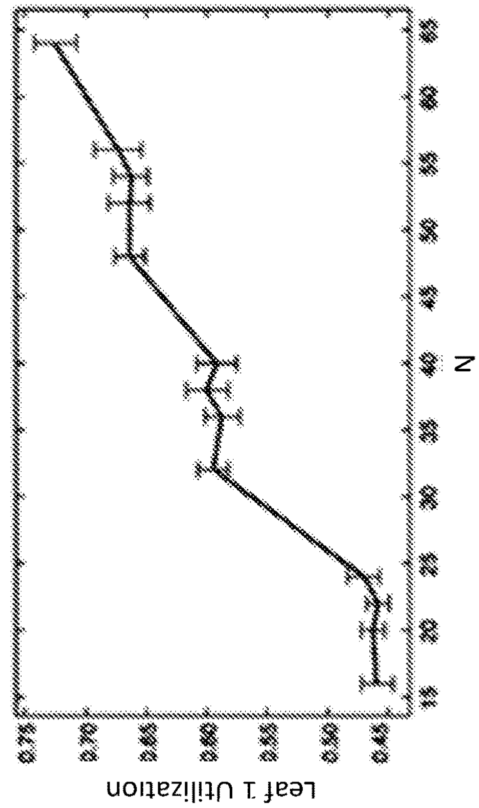
FIGS. 5A-5D are plots illustrating measured utilization output from a queuing network model using ECMP alone.
Figure 5B:
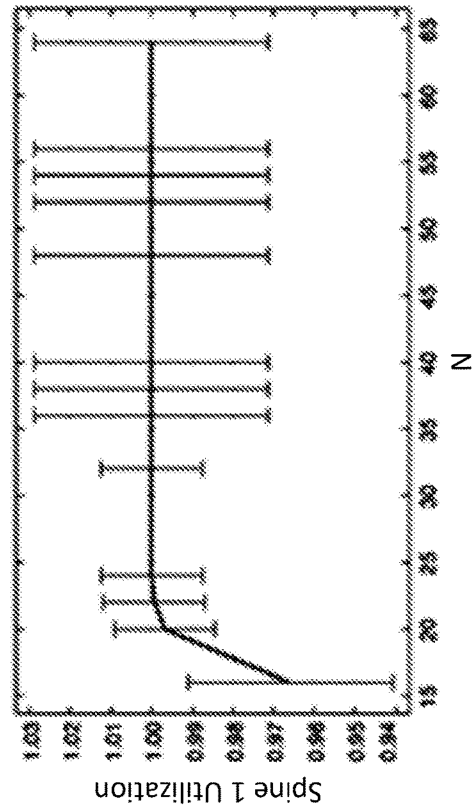
Figure 5C:
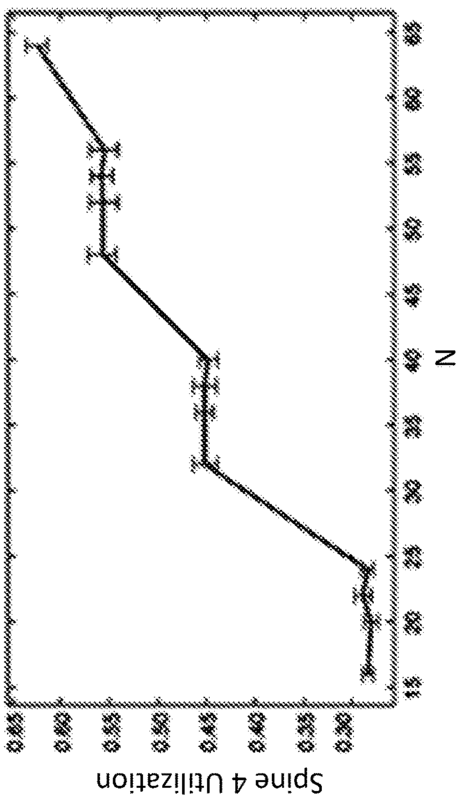
Figure 5D:
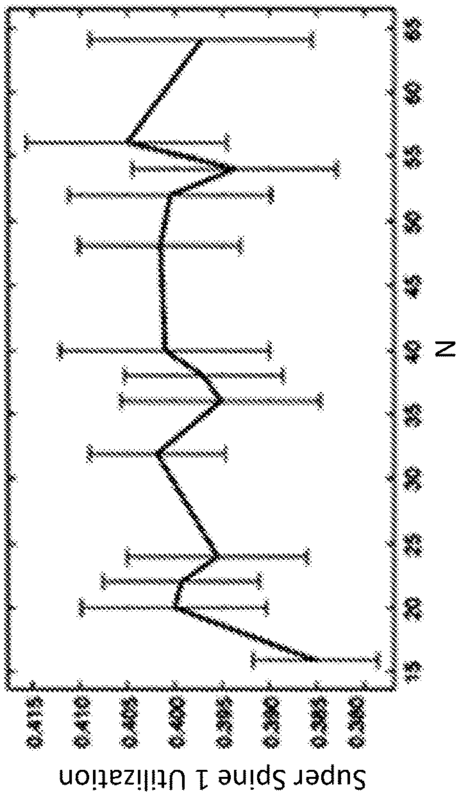

FIGS. 5A-5D are plots illustrating measured utilization output from a queuing network model using ECMP alone. The plots of FIGS. 5A-5D are outputs of the example queueing network model of FIG. 4 with the elephant and mouse flows of FIG. 3 input to the queueing network model. FIG. 5A is a plot of measured utilization of an increasing workload N for leaf node 1 of FIG. 4. FIG. 5B is a plot of measured utilization of an increasing workload N for spine node 1 of FIG. 4. FIG. 5B shows a bottleneck at spine node 1 corresponding to 100% utilization of spine node 1 for increasing workload N. FIG. 5C is a plot of measured utilization of an increasing workload N for spine node 4 of FIG. 4. FIG. 5D is a plot of measured utilization of an increasing workload N for super spine node 1 of FIG. 4.

The outputs of the queueing network model illustrated in FIGS. 5A-5D can be used to analyze the performance of the fat tree network. It is noted that with ECMP routing techniques, spine node 1 is a bottleneck with 100% utilization and high residence time. This is due to the interaction between the elephant and mouse flows of FIG. 3 that were not resolved by ECMP alone, despite having additional resources in other spines (e.g., spine node 4). For differentiated 5G services with specific quality of service (Qos) guarantees, traffic flows that can be scheduled on a bottleneck node can be a deterrent. In contrast, various embodiments of the present disclosure include dynamic reconfiguration to schedule and route traffic flows within a fat tree network using a multi agent reinforcement learning.

Multi agent reinforcement learning will now be discussed further. While single agent reinforcement learning solutions may be used in some scenarios, for larger scale applications with heterogeneous action spaces and local observations, multi-agent deployments are useful. Advantages of multi-agent reinforcement learning include, without limitation, RL agents need to only search through limited action spaces and can benefit from shared experiences and coordination; faster processing may be made possible due to parallel computation; multi-agent RL may allow easy insertion of new RL agents into the system, leading to a high degree of scalability; and, when one or more RL agents fail in a multi-agent RL system, the remaining RL agents can take over some of their tasks. Such scalable deployments of multiple RL agents may be particularly beneficial in larger datacenters (e.g., with hundreds of servers, tens of super-spine nodes, and hundreds of leaf and spine nodes). It is noted the RL agents do not have centralized control but, rather, coordinate configurations to achieve improved or optimal performance.

In some embodiments, the RL agents use a decentralized partially observable Markov Decision Process (Dec-POMDP). The Dec-POMDP includes a team of RL agents that collaborate to maximize a global reward based on local information.

In some embodiments, a decentralized partially observable MDP is a tuple $\langle I,S,\{A_i\},P,\{\Omega_i\},O,R,h\rangle$, where:

I is a finite set of agents indexed 1, . . . , n.

S is a finite set of states, with distinguished initial state so.

$A_i$ is a finite set of actions available to agent I, and $\hat{A}=\times i\in IA_i$ is the set of joint actions.

P: $S\times\hat{A}\rightarrow\Delta S$ is a Markovian transition function. P(s'|s,â) denotes the probability that after taking joint action a in state s a transition to state s' occurs.

$\Omega_i$ is a finite set of observations available to agent I, and $\hat{\Omega}=\times_{i\in I}\Omega_i$ is the set of joint observations.

O: $\hat{A}\times S\rightarrow\Delta\Omega$ is an observation function. O(ô|â,s') denotes the probability of observing joint observation ô given the joint action â led to state s'.

R: $\hat{A}\times S\rightarrow R$ is a reward function. R(â,s') denotes the reward obtained after joint action â was taken and a state transition to s' occurred.

If the Dec-POMDP has a finite horizon, that horizon is represented by positive integer h.

In order to develop RL agents to configure and provide dedicated service within a fat tree network, in some embodiments, a Multi-Agent Decision Process (MADP) toolbox is used. See e.g., Frans A. Oliehoek, Matthew T. J. Spann, Bas Terwijn, Philipp Robbel, João V. Messias, "The MADP Toolbox: An Open Source Library for Planning and Learning in (Multi-) Agent Systems", Journal of Machine Learning Research 18 (2017) I-5, https://www.imir.org/papers/volume18/17-156/17-156.pdf (accessed on 15 Nov. 2021), which is hereby incorporated by reference in full. The toolbox can provide a specified format to solve dec-POMDP problems with inbuilt solvers such as Generalized Multi-agent A* (GMAA) and Joint Equilibrium-based Search for Policies (JESP). GMAA can make use of variants of heuristic search that use collaborative Bayesian games to represent one-stage node expansion problems. JESP can perform alternating maximization in the space of entire policies. JESP can fix a set of policies and can optimize the policy of each RL agent through dynamic programming.

With reference to FIG. 4, an example embodiment of joint states, actions, and observations in MADP is as follows:

Agents: leaf spine superspine (ss or sspine)

Joint states:

leaf_green_spine1_green_spine4_green_ss_green leaf_green_spine1_red_spine4_green_ss_green leaf_red_spine1_green_spine4_green_ss_green leaf_red_spine1_green_spine4_green_ss_green Actions:

Agent 1: ECMP decrease_flow set_priority0 RED_drop_set

Agent 2: ECMP load_balance

Agent 3: ECMP load_balance

Observations:

Agent 1: throughput_change_latency_change_leaf

Agent 2: throughput_change_latency_change_spine

Agent 3: throughput_change_latency_change_sspine

In the above example embodiment of joint states, actions, and observations, three RL agents are used at the leaf, spine, and super spine levels. The joint states are specified on utilization of queues where, $$\text{state} = \begin{cases} \text{green} & \text{if utilization} < 70\% \\ \text{red} & \text{if utilization} >= 70\% \end{cases}$$

In some embodiments, each of the RL agents also have specific action spaces. While the RL agents at the spine and super-spine levels may make use of ECMP or intelligent load balancing, the leaf agents can have other configurations, such as decreasing flow rate, changing priority of flows, and increasing packet drop rates. The observation spaces for these RL agents include, without limitation, the throughput and latencies of the links connected within layers.

Continuing with the above example embodiment, in order to derive the transition and observation probabilities needed within the MADP model, multiple configurations in the queuing network model in FIG. 4 are used. The following table provides an example of various configurations for traffic load balancing, shaping, and service prioritization.

| Config. | Leaf Agent | Spine Agent | Super Spine Agent |
|---|---|---|---|
| 1 | initialize | initialize | initialize |
| 2 | ECMP | ECMP | ECMP |
| 3 | Decrease flow (50%) | ECMP | ECMP |
| 4 | equal priority | ECMP | ECMP |
| 5 | RED drop (queue depth) | ECMP | ECMP |
| 6 | ECMP | load balance | ECMP |
| 7 | ECMP | ECMP | load balance |

Figure 6A:
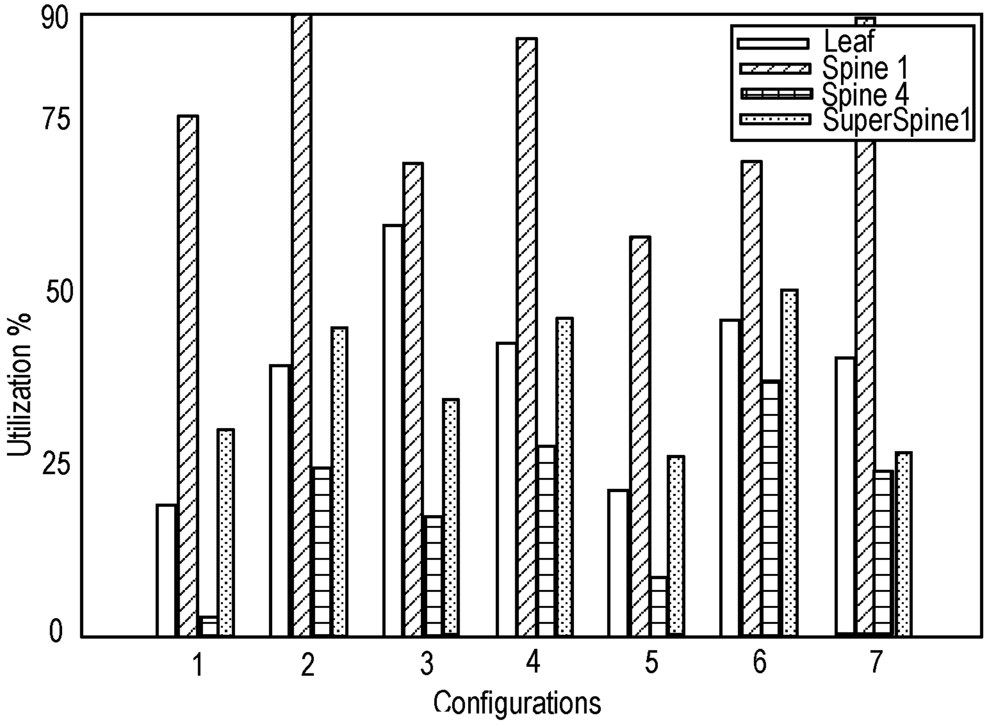
FIGS. 6A and 6B are plots illustrating configuration changes and their respective impact on utilization percentage and latency, respectively, at various nodes in the leaf, spine, and super spine levels in accordance with some embodiments of the present disclosure.
Figure 6B:
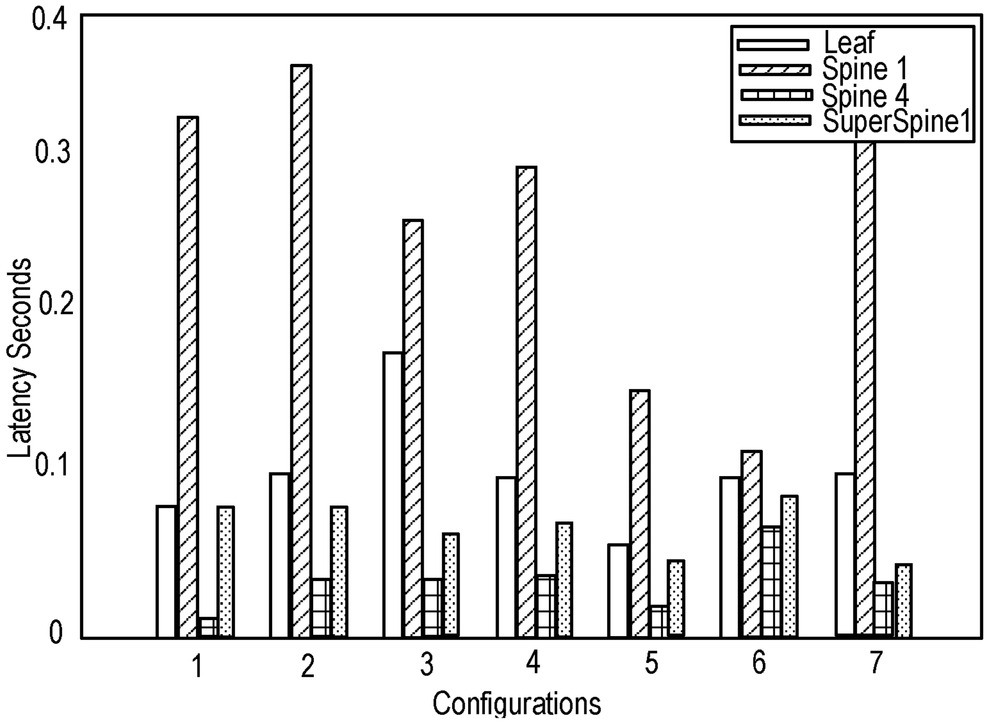

With reference to the above table, it is noted that ECMP is integrated as an option to compare with other configuration changes such as load balancing, RED drop, and flow priority change. In the example embodiment, the configurations are input along with multiple elephant and mouse flows (e.g., varying arrival rates, priorities, traffic types) and an output is produced as illustrated in FIGS. 6A and 6B. FIG. 6A is plot illustrating the seven configuration changes of the above table and their respective impact on utilization percentage at various nodes in the leaf, spine, and super spine levels. FIG. 6B is a plot illustrating the seven configuration changes of the above table and their respective impact on latency at various nodes in the leaf, spine, and super spine levels. Configurations 6 and 7 include an intelligent "load balance" action at the spine agent and the super spine agent, respectively, where traffic weights are changed depending on the node utilization (e.g., versus equal weights in ECMP). FIGS. 6A and 6B show that making certain actions can have a high or low impact on the utilization/latency at individual nodes.

Continuing with the example embodiment, values from FIGS. 6A and 6B can be used to derive the transition and observation probabilities to be input into the Dec-POMDP model. For example, the probability that a particular action causes a state or an observation change is evaluated, as summarized below:

Transitions: action per agent: start state: end state: probability

T: decrease_flow ECMP ECMP: *: leaf_green_spine1_red_spine4_green_ss_green: 1.0

T: decrease_flow ECMP load_balance: *: leaf_green_spine1_red_spine4_green_ss_green: 1.0

T: decrease_flow load_balance ECMP: *: leaf_green_spine1_green_spine4_green_ss_green: 1.0

T: decrease_flow load_balance load_balance: *: leaf_green_spine1_green_spine4_green_ss_green: 1.0

T: set_priority0 ECMP ECMP: *: leaf_green_spine1_red_spine4_green_ss_green: 1.0

T: set_priority0 ECMP load_balance: *: leaf_green_spine1_red_spine4_green_ss_green: 1.0

T: set_priority0 load_balance ECMP: *: leaf_green_spine1_green_spine4_green_ss_green: 1.0

Observations: action per agent: start state: joint observation: probability

O: decrease_flow ECMP load_balance: *: throughput_down_leaf_latency_up throughput_down_spine_latency_down throughput_down_ss_latency_down: 1.0

O: set_priority0 ECMP load_balance: *: throughput_down_leaf_latency_drop: throughput_down_spine_latency_down throughput_down_ss_latency_down: 1.0

O: RED_drop_set ECMP load_balance: *: throughput_down_leaf_latency_drop: throughput_down_spine_latency_down throughput_down_ss_latency_down: 1.0

O: decrease_flow load_balance load_balance: *: throughput_up_leaf_latency_drop throughput_up_spine_latency_down throughput_up_ss_latency_down: 1.0

O: set_priority0 load_balance load_balance: *: throughput_up_leaf_latency_drop throughput_up_spine_latency_down throughput_up_ss_latency_down: 1.0

O: RED_drop_set load_balance load_balance: *: throughput_up_leaf_latency_drop throughput_up_spine_latency_down throughput_up_ss_latency_down: 1.0

Additionally, continuing with the example embodiment, a combination of joint actions that lead to a state or observation change is provided with a reward value formulated as follows:

$$\text{reward} = \frac{\text{throughput}}{\text{residence time} \times \text{bottleneck utilization}}$$

which rewards for higher throughput performance of a traffic flow while minimizing the number of high utilization nodes. As a consequence, not only is load balancing optimized, but differentiated services are also provided.

Example reward values include as follows:

Rewards (R): Action per agent: start state: end state: observations: reward value R: decrease_flow * *: *: *: *: 218

R: set_priority0 * *: *: *: *: 220

R: RED_drop_set * *: *: *: *: 199

R: * load_balance *: *: *: *: 408

R: * * load_balance: *: *: *: 207

The above reward structure is an example and embodiments of the present disclosure are not limited to this structure. Rather, an advantage of RL is the ability to change the reward structure dependent on the intents. Thus, the above reward structure can be modified to generate a variety of alternate policies to be deployed on fat tree networks.

Controller integration will now be discussed further. The following table provides example embodiments on how the RL agents can be integrated within SDN, collaborative computing frameworks (CCF), or application centric infrastructure (ACI) architectures:

| Controller Type | Agent Training | Agent Deployment | Agent Actions | Agent Update |
|---|---|---|---|---|
| SDN controllers include, without limitation, Floodlight, OpenDayLight, or other controllers (e.g., controller deployments by Cisco, Juniper, Arista, etc.). Has a | The RL agents are trained offline over different traffic patterns. | RL agents are deployed at leaf, spine and super-spine nodes (e.g., switches). States are | Actions are generated by each RL agent based on policy rewards. This is sent to the centralized SDN controller for configuration | Changes in traffic or intent rewards needs to be updated. The RL agent policy can be retained offline and updated to |

-continued

| Controller Type | Agent Training | Agent Deployment | Agent Actions | Agent Update |
|---|---|---|---|---|
| centralized view of the datacenter network. | | tracked by the RL agent. | commits and execution. | the leaf, spine, super-spine nodes. |
| Arista Converged Cloud Fabric (CCF). The CCF architecture includes a physical switching fabric, which is based on a leaf-spine Clos architecture. Intelligence in the fabric is hierarchically placed-most of it in the CCF Controller (where configuration, automation and troubleshooting occur). | The RL agents are trained offline over different traffic patterns. | RL agents are deployed at the leaf, spine and super-spine nodes (e.g., switches). States are tracked by the RL agent. This can be collocated in the SwitchLight operating system within CCF switches. | Actions are generated by each RL agent based on policy rewards. This can be enforced via the SwitchLight controller operations. The RL framework provides an alternative learning framework that may be connected with other domains (e.g., Kubernetes pod placement, transport, radio resources). | Changes in traffic or intent rewards needs to be updated. The RL agent policy can be retained offline and updated to the leaf, spine, super-spine nodes. |
| Cisco Application Centric Infrastructure intent-based networking framework to enable agility and resiliency in the data center. It captures higher-level business and user intent in the form of a policy and translates this policy into the network constructs necessary to dynamically provision the network, security, and infrastructure services. | The RL agents are trained offline over different traffic patterns. | RL agents are deployed at the leaf, spine and super-spine nodes (e.g., switches). States are tracked by the RL agent. This is collocated with the Cisco nexus series leaf/spine switches coordinating with the application controller. | Actions are generated by each RL agent based on policy rewards. This is enforced via the centralized policy controller. Note that the multi-agent system can allow for superior scale and distribution among RL agents. Comparison with the Cisco controller policy and the intelligent agent policy can be done. | Changes in traffic or intent rewards needs to be updated. The RL agent policy can be retained offline and updated to the leaf, spine, super-spine nodes. |
| ISTIO service mesh. Istio is an open source service mesh that layers transparently onto existing distributed applications. Istio's powerful features can provide a uniform and more efficient way to secure, connect, and monitor services. Istio can be a path to load balancing, service-to-service authentication, and monitoring, with few or no service code changes. | The RL agents are trained offline over different traffic patterns. | RL agents are deployed at the leaf, spine and super-spine nodes (e.g., switches). States are tracked by the RL agent. | Actions are generated by each RL agent based on policy rewards. This is enforced via the ISTIO controller for the service mesh. Side effects with respect to Kubernetes nodes may also be included. | Changes in traffic or intent rewards needs to be updated. The RL agent policy can be retained offline and updated to the leaf, spine, super-spine nodes. |

RL agent state and action space will now be discussed further. An example embodiment of global states is as follows:

| | |
|---|---|
| Joint States | The joint states are a cross product of individual leaf, spine and super-spine utilization states with the traffic. This traffic mix depends on the number of virtual network function (VNF) pods, capacity, and server location.<br>Eq. Traffic_mix1_leaf_utilization<20%_spine utilization>50%_superspine_utilization<20%<br>In addition, SLAs may be placed at the level of each of the flows. |

-continued

1. Traffic_pattern1_east-west_leaf_spine_superspine_states
2. Traffic_pattern2_north_south_ leaf_spine_superspine_states
3. Traffic_mix1_ leaf_spine_superspine_states
4. Traffic_mix2_ leaf_spine_superspine_states
5. Traffic_mix_flow1_SLA_valid_ leaf_spine_superspine_states
6. Traffic_mix_flow1_SLA_invalid_ leaf_spine_superspine_states -continued

| | |
|---|---|
| Global Rewards | 1. + reward value ("ve") Meeting the SLA targets of higher priority services<br>2. +ve Being energy efficient by reducing the number of active servers<br>3. +ve for higher fault tolerance |

While example embodiments are explained herein with one RL agent each for the leaf, spine super-spine levels, the present disclosure is not so limited. Rather, the RL agents may be expanded to configure only a subset of nodes at individual hierarchies (e.g., have multiple peer leaf, spine, super-spine agents).

An example embodiment of states, actions, observations, and rewards for a super spine agent are as follows:

| | |
|---|---|
| States | 1. Super-spine_utilization<20%<br>2. Super-spine_utilization<50%<br>3. Super-spine_utilization<70%<br>4. Super-spine_utilization>=70% |
| Actions | 1. ECMP Load balancing<br>2. Intelligent weight load balancing weights (load aware)<br>3. Priority queue scheduling at switch port<br>4. FIFO queue scheduling at switch port<br>5. RED packet drop at switch port<br>6. Limit processing rate of flow at switch port |
| Observations | 1. Per_flow throughput increase, decrease at super-spine<br>2. Per_flow_residence time/packet delay increase, decrease at super-spine<br>3. Per_flow packet drop increase, decrease at super-spine<br>4. Retransmission<br>5. Outages of the link<br>6. Reliability/resiliency |
| Rewards | 1. +ve for reduced packet drop or latency<br>2. +ve for improved throughput<br>3. +ve for NOT crossing 70% utilization of super-spine<br>4. Combination of global rewards based on other levels performance (contribution to SLA met for flow) |

An example embodiment of states, actions, observations, and rewards for a spine agent are as follows:

| | |
|---|---|
| States | 1. Spine_utilization<20%<br>2. Spine_utilization<50%<br>3. Spine_utilization<70%<br>4. Spine_utilization>=70% |
| Actions | 1. ECMP Load balancing<br>2. Intelligent weight load balancing weights (load aware)<br>3. Priority queue scheduling at switch port<br>4. FIFO queue scheduling at switch port<br>5. RED packet drop at switch port<br>6. Limit processing rate of flow at switch port |
| Observations | 1. Per_flow throughput increase, decrease at spine<br>2. Per_flow_residence time/packet delay increase, decrease at spine<br>3. Per_flow packet drop increase, decrease at spine<br>4. Retransmission<br>5. Outages of the link<br>6. Reliability/resiliency |
| Rewards | 1. +ve for reduced packet drop or latency<br>2. +ve for improved throughput<br>3. +ve for NOT crossing 70% utilization of spine<br>4. −ve reward for link outage<br>5. Combination of global rewards based on other levels performance (contribution to SLA met for flow) |

An example embodiment of states, actions, observations, and rewards for a leaf agent are as follows:

| | |
|---|---|
| States | 1. Spine_utilization<20%<br>2. Spine_utilization<50%<br>3. Spine_utilization<70%<br>4. Spine_utilization>=70% |
| Actions | 1. ECMP Load balancing<br>2. Priority queue scheduling of flow<br>3. FIFO queue scheduling at switch port<br>4. RED packet drop at switch port increase, decrease<br>5. Limit processing rate of flow at switch port<br>6. Limit CIR/PIR of flow |
| Observations | 1. Per_flow throughput increase, decrease at leaf<br>2. Per_flow_residence time/packet delay increase, decrease at leaf<br>3. Per_flow packet drop increase, decrease at leaf<br>4. Retransmission<br>5. Outages of the link<br>6. Reliability/resiliency |
| Rewards | 1. +ve for reduced packet drop or latency<br>2. +ve for improved throughput<br>3. +ve for NOT crossing 70% utilization of leaf<br>4. Combination of global rewards based on other levels performance (contribution to SLA met for flow) |

Continuing with the example embodiment, traffic shaping and load balancing are now discussed further.

Figure 7A:
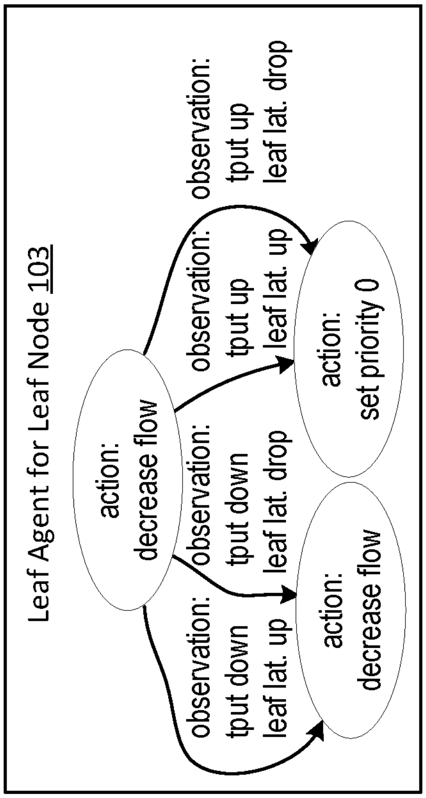
FIGS. 7A-7C are schematics illustrating policy output generated by leaf, spine and super-spine agents, respectively, in accordance with some embodiments of the present disclosure.
Figure 7B:
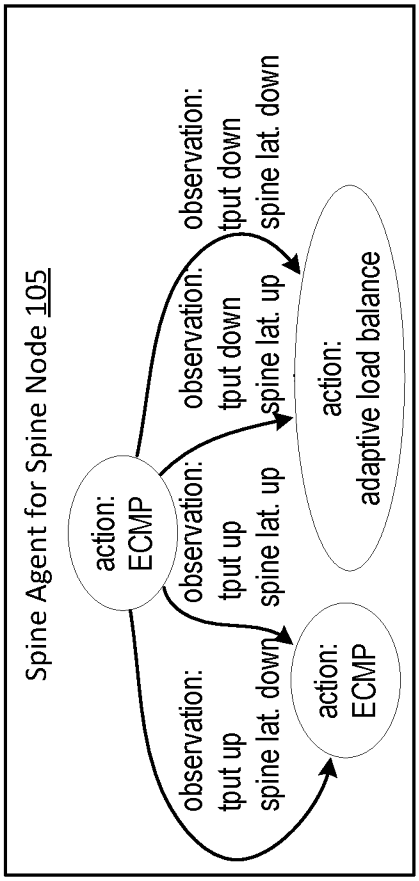
Figure 7C:
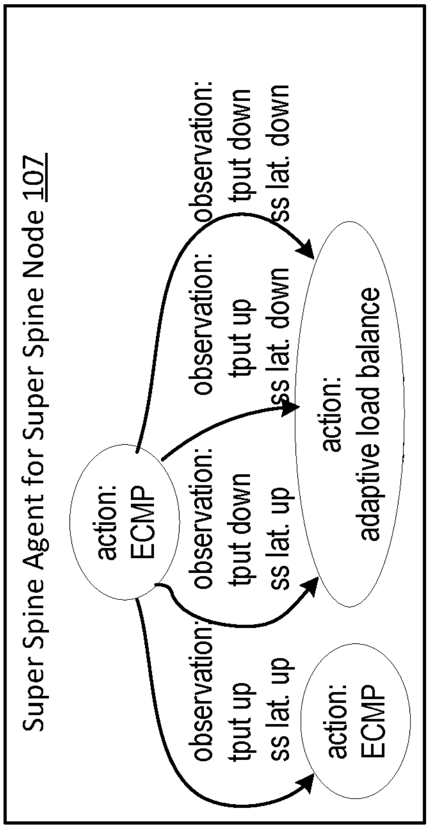

Performance of the method of the present disclosure including multi-agent RL was analyzed in comparison to ECMP alone using the combination of East-West and North-South traffic shown in FIG. 3 and the fat tree network of FIG. 4. The traffic flow of FIG. 3 produced a bottleneck in spine node 1 as shown denoted in FIG. 4 that was not resolved by ECMP alone. FIGS. 7A-7C are schematics illustrating an example policy output generated by GMAA for leaf, spine and super-spine agents, respectively, of FIG. 4 in accordance with some embodiments of the present disclosure. The policies include action observation interactions dependent on belief states tracked by the Dec-POMDP model. While the following example embodiments include example action observation interactions, the present disclosure is not so limited and other action observation interactions may occur.

Policy 1 includes action observation interactions of leaf agent for leaf node 103 are illustrated in FIG. 7A. Leaf agent took an action to decrease flow and observed, e.g., that (1) when throughput (tput) went down, latency went up (leaf lat. up) at leaf node 103; and (2) when throughput went down, latency at leaf node 103 dropped (leaf lat. drop). When leaf agent took an action to decrease flow and set priority to 0, leaf agent observed, e.g., that (1) when throughput went up at leaf node 103, latency went up at leaf node 103; and (2) when throughput went down at leaf node 103, latency dropped at leaf node 103.

Policy 2 includes action observation interactions of spine agent for spine node 105 are illustrated in FIG. 7B. Spine agent took an action to perform ECMP and, e.g., observed that (1) when throughput went up, latency at spine node 105 (i.e., spine 1 in FIG. 4) went down (spine lat. down); and (2) when throughput went up at spine node 105, latency went up (spine lat. up) at spine node 105. When spine agent to an action to perform ECMP and adaptive load balance, spine agent observed, e.g., that (1) when throughput went down, latency at spine node 105 went up; and (2) when throughput went down, latency at spine node 105 went down.

Policy 3 includes action observation interactions of super spine agent for super spine node 107 are illustrated in FIG. 7C. Super spine agent took an action to perform ECMP and observed, e.g., that (1) when throughput went up, latency at super spine node 107 went up (ss lat. up); and (2) when throughput went down at super spine node 107, latency went up (ss lat. up) at super spine node 107. When super spine agent took an action to perform ECMP and adaptive load balance, super spine agent observed, e.g., that (1) when throughput went up, latency at super spine node 107 went down; and (2) when throughput went down, latency at super pine node 107 went down.

Still referring to FIGS. 7B and 7C, policies 2 and 3 of the spine agent for spine node 105 and the super-spine agent for super spine node 107 made use of a combination of ECMP, and intelligent load balancing by diverting traffic to low utilization nodes via adaptive weights.

Figure 8A:
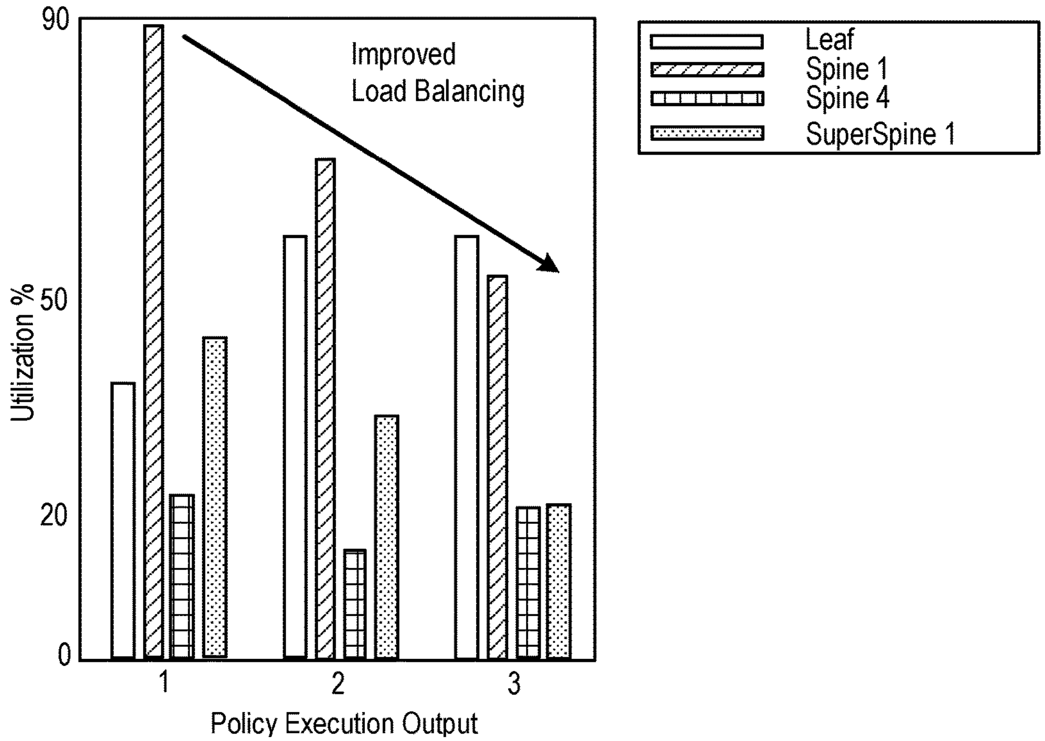
FIGS. 8A and 8B are plots illustrating output of the example queuing network model of FIG. 4 in accordance with some embodiments of the present disclosure.
Figure 8B:
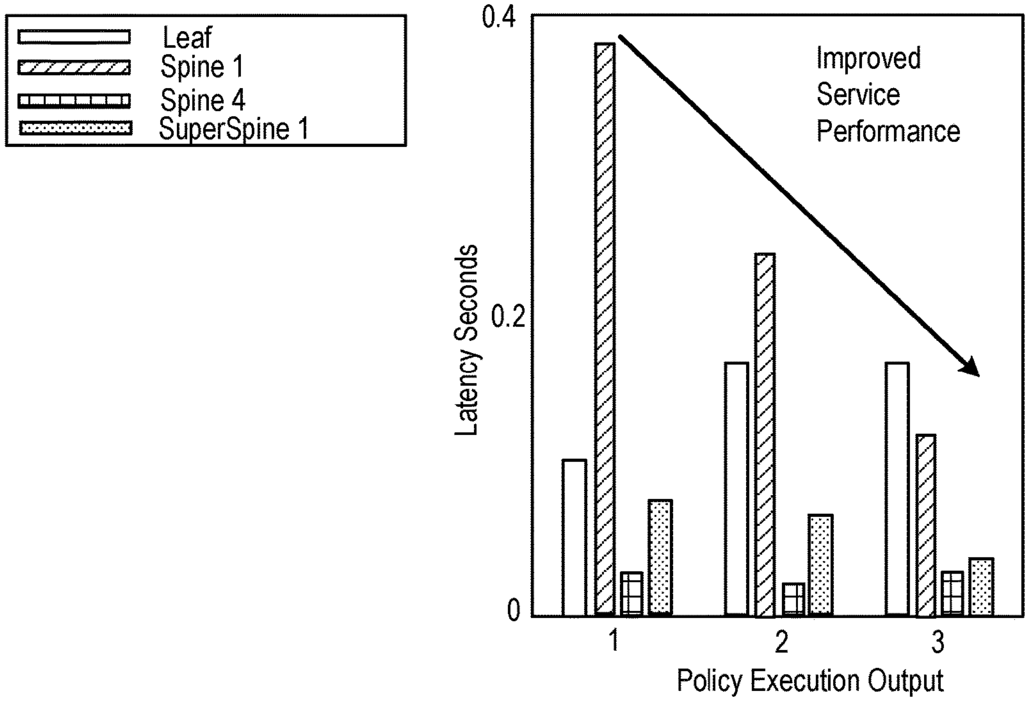

When input to the queuing network model in FIG. 4, policies 1-3 of FIGS. 7A-7C, respectively, produce the output illustrated in FIGS. 8A and 8B in accordance with some embodiments of the present disclosure. As shown in FIG. 8A, spine 1 was in the Red utilization level (that is, greater than 70% utilization) and moved down to the Green utilization level (that is, less than 70% utilization) due to a combination of actions of the leaf, spine, and super-spine agents provided by MALTA. As illustrated in FIG. 8B, this also impacted the latency at particular nodes (e.g., latency at spine node 1 decreased), which can be important for differentiated service performance.

As discussed herein, a potential technical advantage of making use of multi-agent RL techniques may be the ability to provide superior services for network slices. In another example embodiment, improvement of a particular flow of the data center of FIG. 2 was analyzed for the following routing path: Incoming-Pod1-Pod2-Pod4-Pod17-Outgoing. FIGS. 9A and 9B are plots for this routing path that show that when the flow is mixed with ECMP, there is deterioration in both throughput and latency. In contrast, the use of MALTA in accordance with some embodiments of the present disclosure improved performance with a 46% latency improvement and a 34% throughput improvement over ECMP. As a consequence, the multi agent reinforcement learning system was beneficial both for superior load balancing across a fat tree network as well as for differentiated service performance.

Figure 10A:
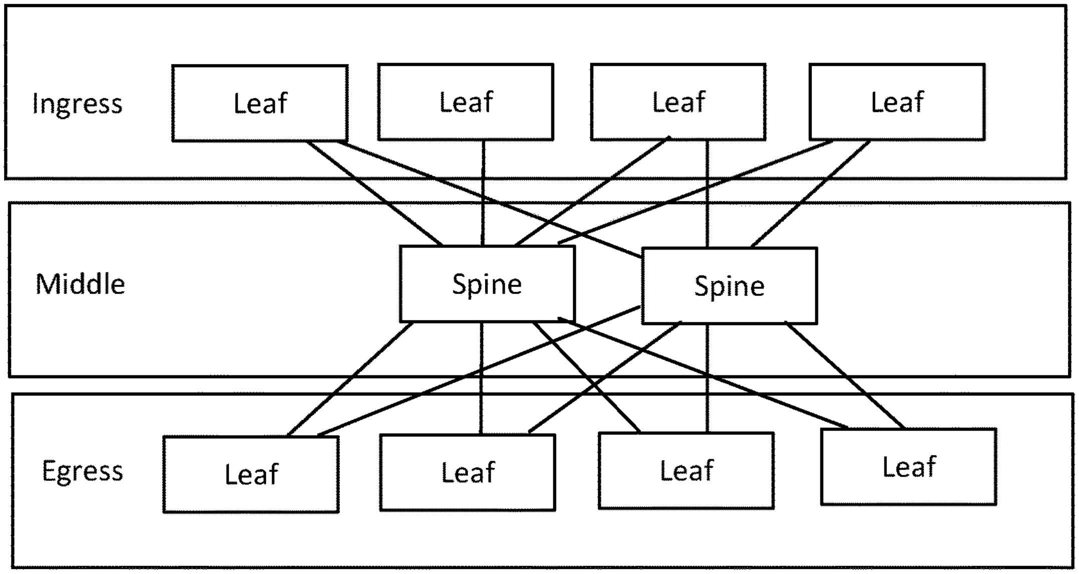
FIGS. 10A-10D are schematic diagrams of a variety of respective CLOS topologies in accordance with some embodiments of the present disclosure.
Figure 10B:
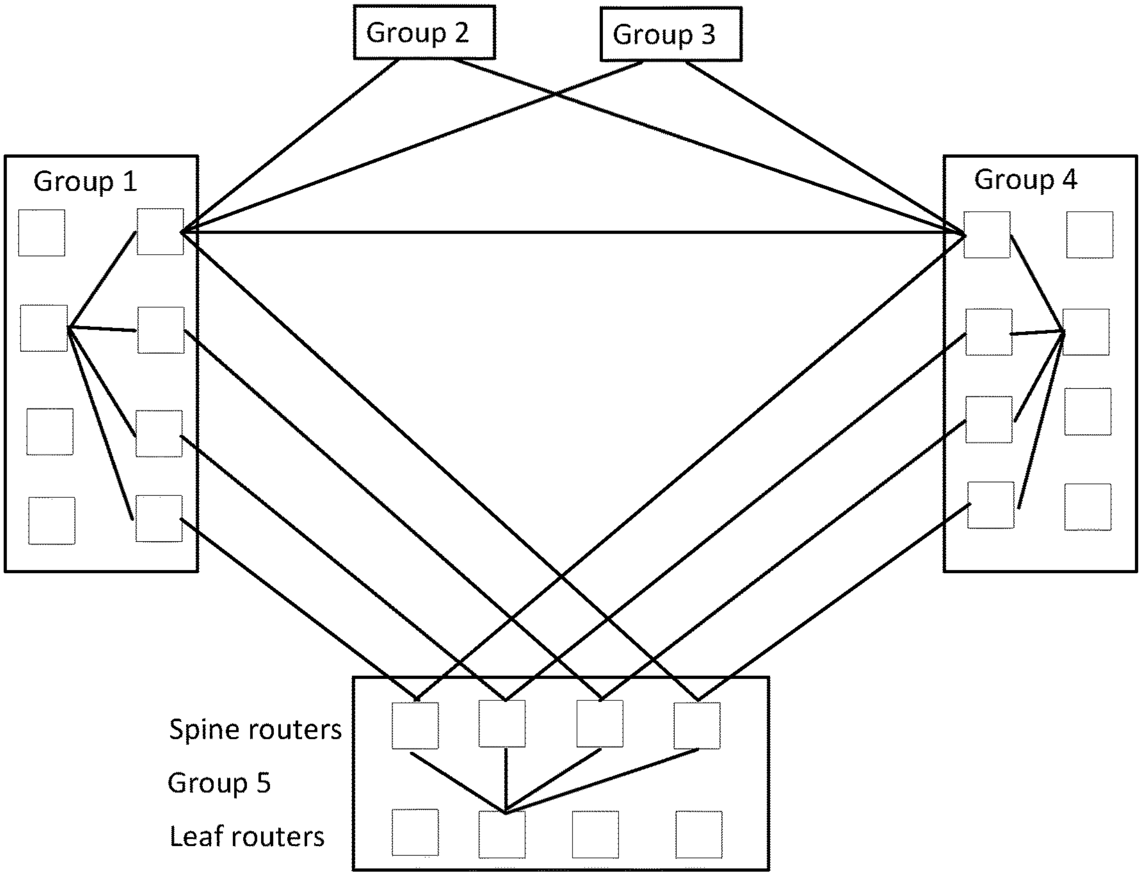
Figure 10C:
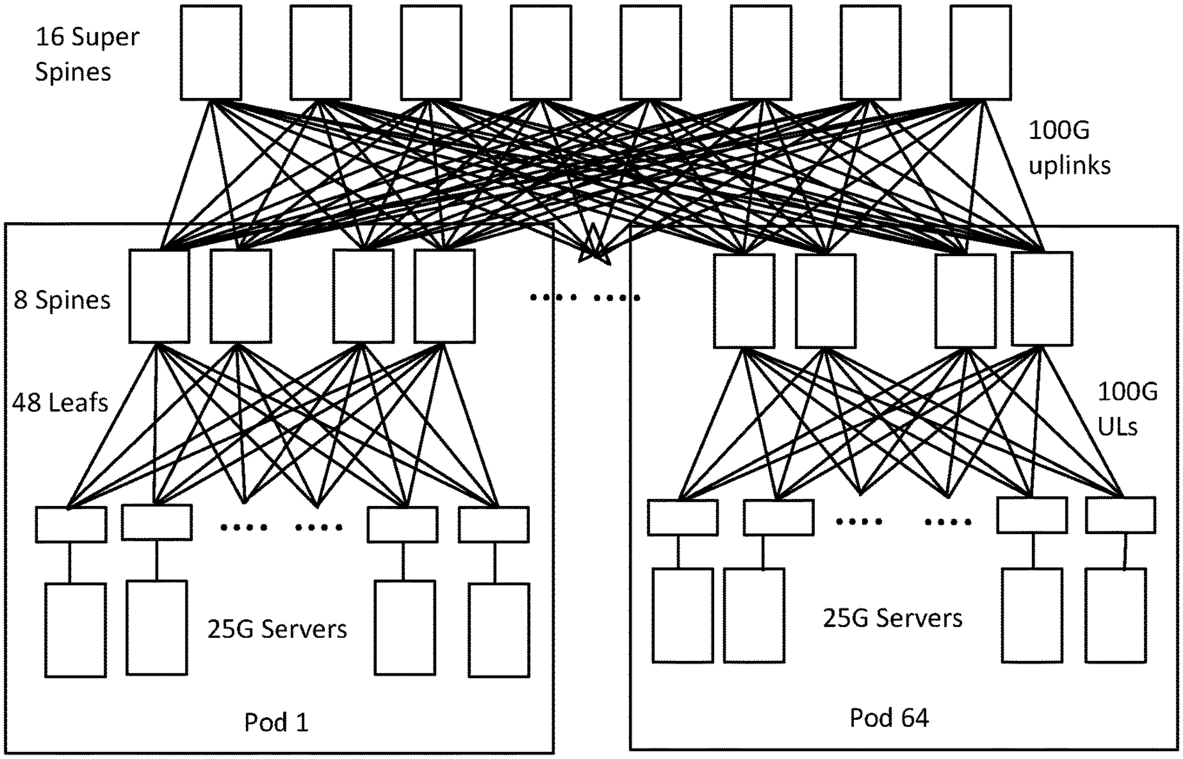
Figure 10D:
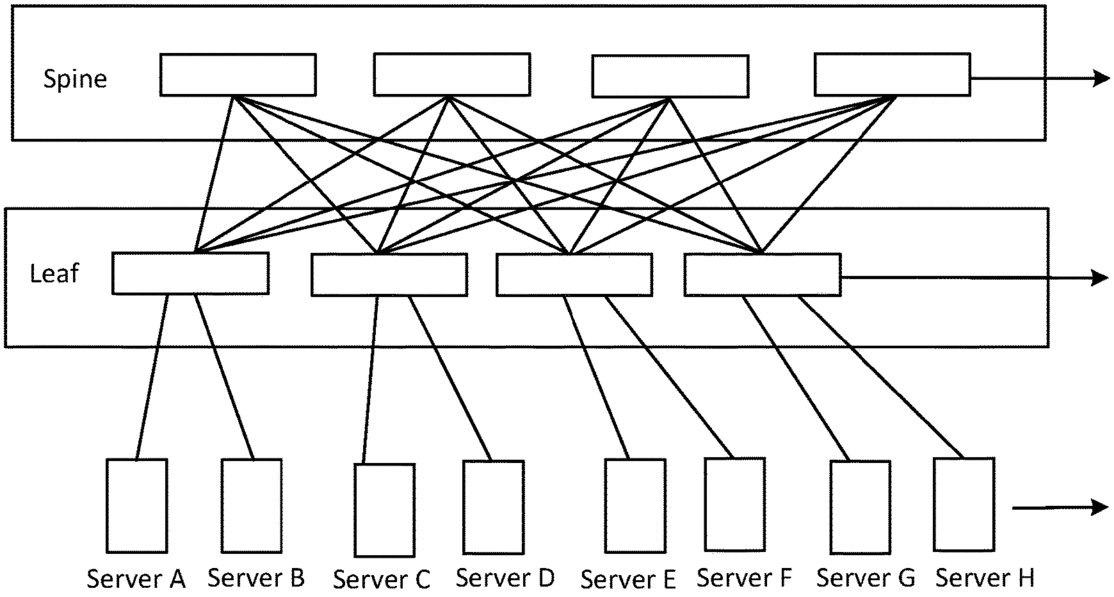

Architectural frameworks and use cases for the method of the present disclosure will now be discussed further. FIGS. 10A-10D are schematic diagrams of a variety of respective CLOS topologies in accordance with some embodiments of the present disclosure. While example embodiments discussed above include a CLOS3 open topology, embodiments of the present disclosure are not so limited. Rather, leaf spine, and super spine agents can be deployed similarly for other architectures, including other data center architectures. FIGS. 10A-10D illustrate other architectures that can be similarly configured using a multi-agent reinforcement learning method. FIG. 10A illustrates an example embodiment of a closed CLOS3 topology (leaf and spine). FIG. 10B illustrates an example embodiment of a dragonfly topology. FIG. 10C illustrates and example embodiment of a CLOS3 topology with 16 super spine nodes. FIG. 10D illustrates an example embodiment of an open CLOS2 topology.

Example use cases for the method of the present disclosure include, without limitation, the following use cases within data center networking. A first example use case involves noisy neighbors. "Noisy neighbor" is a phrase that may be used to describe a data center infrastructure co-tenant that monopolizes bandwidth, disk inputs/outputs (I/O), central processing units (CPU), and other resources, and may negatively affect other users' performance. A noisy neighbor effect can occur when an application or virtual machine uses the majority of available resources and causes network performance issues for others on the shared infrastructure. A lack of bandwidth can be one cause of network performance issues. Bandwidth carries data throughout a network, so when one application or instance uses too much, other applications may suffer from slow speeds or latency. In some embodiments, through use of the method of the present disclosure including multi-agent RL, the noisy neighbour(s) can be identified and placed in appropriate locations or provided appropriate weights to reduce the effect on other pods.

Figure 11:
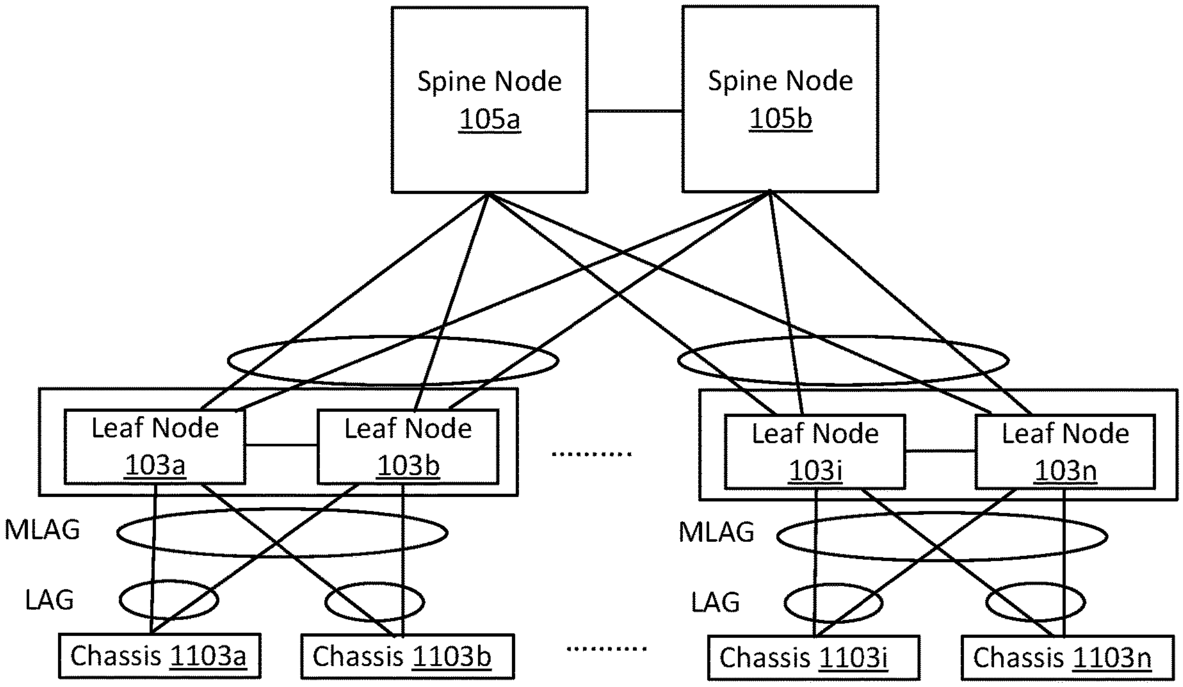
FIG. 11 is schematic diagram of an example embodiment of multi-chassis LAG groups in accordance with some embodiments of the present disclosure.

Another example use case involves multi-chassis lag grouping. A multi-chassis link aggregation group is a type of link aggregation group (LAG) with constituent ports that terminate on separate chassis, primarily for the purpose of providing redundancy in the event one of the chassis fails. A LAG is a method of inverse multiplexing over multiple Ethernet links, thereby increasing bandwidth and providing redundancy. FIG. 11 is schematic diagram of an example embodiment of multi-chassis LAG groups in accordance with some embodiments of the present disclosure. The multi-chassis LAG groups of the example network of FIG. 11 can be enabled/disabled, which may provide superior redundancy within the network. The shared bandwidth also may alleviate East-West traffic between nodes.

Figure 12:
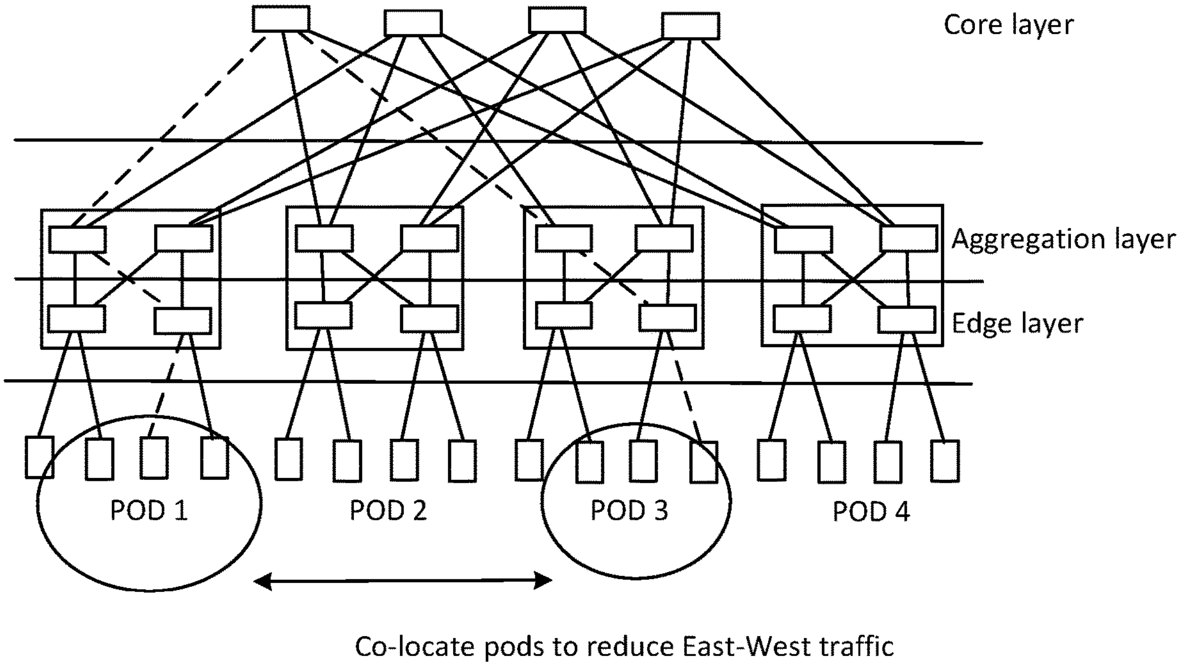
FIG. 12 is a schematic diagram illustrating co-located pods to reduce East-West traffic in accordance with some embodiments of the present disclosure.

In another example use case, workload can be re-engineered. Proper placement of pods is considered to make use of the fat tree network (e.g., optimal use). Due to traffic mix changes or improper pod placement, bottlenecks can occur at multiple links at the leaf, spine, and/or super-spine levels. FIG. 12 is a schematic diagram illustrating co-located pods to reduce East-West traffic in accordance with some embodiments of the present disclosure. The inclusion of multi-agent RL in this example may mitigate the effect of such bottlenecks by coordinating the "workload aware" and "network performance" aware placement/migration of pods as indicated by the circled pods in FIG. 12.

Figure 13:
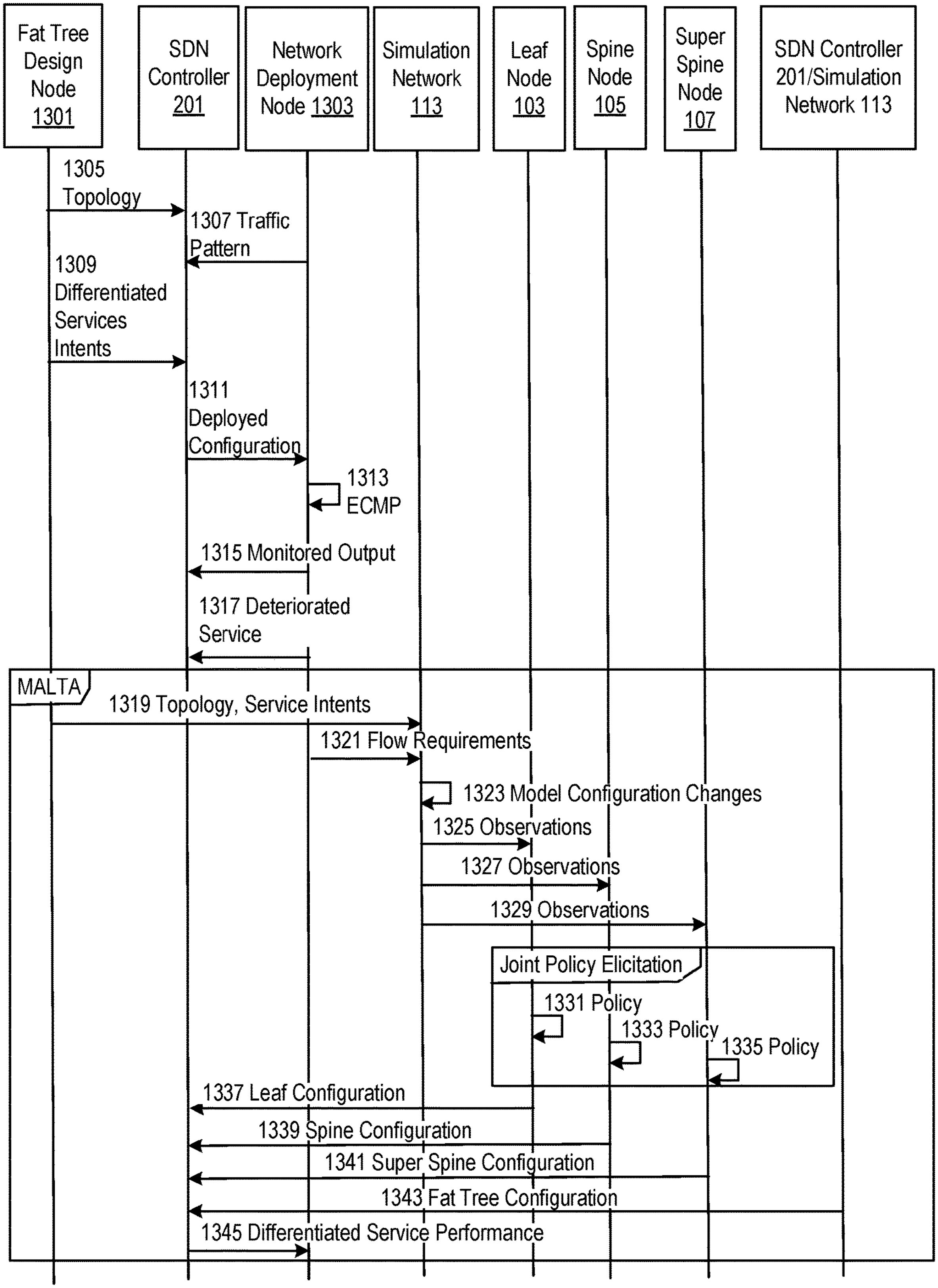
FIG. 13 is a signalling diagram of operations in accordance with some embodiments of the present disclosure.

FIG. 13 is a signalling diagram of operations in accordance with some embodiments of the present disclosure. The fat tree network of FIG. 13 includes the following nodes in, or providing information to and/or control for, the fat tree network: fat tree design node 1301, SDN controller 201, network deployment node 1303, simulation network 113, leaf node 103, spine node 105, super spine node 107, and SDN controller/simulation network 1305. In operations 1305 and 1309, fat tree design node 1301 signals a fat tree network topology and differentiated service intents to SDN controller 201. In operation 1307, network deployment node 1303 signals a traffic flow(s) to SDN controller 201. Responsive to the receipt of the information from operations 1305-1309, SDN controller 201 signals a deployed configuration of the fat tree network to network deployment node 1303. Network deployment node 1303, in operations 1313-1317, performs ECMP and provides to SDN controller 201, a monitored output and a deteriorated service.

Still referring to FIG. 13, operations 1319-1345 are performed in accordance with some embodiments of the present disclosure using MALTA, and can be repeated for changing topology and service intents, etc. In operation 1319, fat tree design node 1301 signals toward simulation network 113 a topology of the fat tree network and service intents for a plurality of traffic flows. In operation 1321, network deployment node 1303 signals toward simulation network 113, requirements for the plurality of traffic flows. In operations 1323-1329, simulation network 113 identifies configuration changes for the fat tree network and signals observations to leaf node 103, spine node 105, and super spine node 107, respectively. In operations 1331-1335, responsive to receiving observations 1325-1329, leaf node 103, spine node 105, and super spine node 197, respectively, execute a policy. Responsive to execution of the policy, in operations 1337-1341, leaf node 103, spine node 105, and super spine node 107 signal towards SDN controller 201 a leaf node 103 configuration, a spine node 105 configuration, and a super spine node 107 configuration, respectively. Responsive to receiving the configurations, SDN controller 201 or simulation network 113, performs the configurations in operation 1343. Responsive to performance of the configuration, SDN controller 201 provides to network deployment node 1303 differentiated service performance.

While example embodiments herein are explained with reference to one leaf node, one spine node, and/or one super spine node at which (or for which) there is a respective leaf agent, spine agent, and super spine agent, the method of the present disclosure is not so limited. Rather, the agents are scalable in deployment and can include any number of leaf, spine, and/or super spine agents. Additionally, while example embodiments herein are explained with reference to a leaf agent, a spine agent, and/or a super spine agent at a leaf node, a spine node, and/or a super spine node performing policy computations, the method of the present disclosure is not so limited. Rather, policy computations may be performed in the cloud with an SDN, or other, controller deploying and/or monitoring agent policies.

Figure 14:
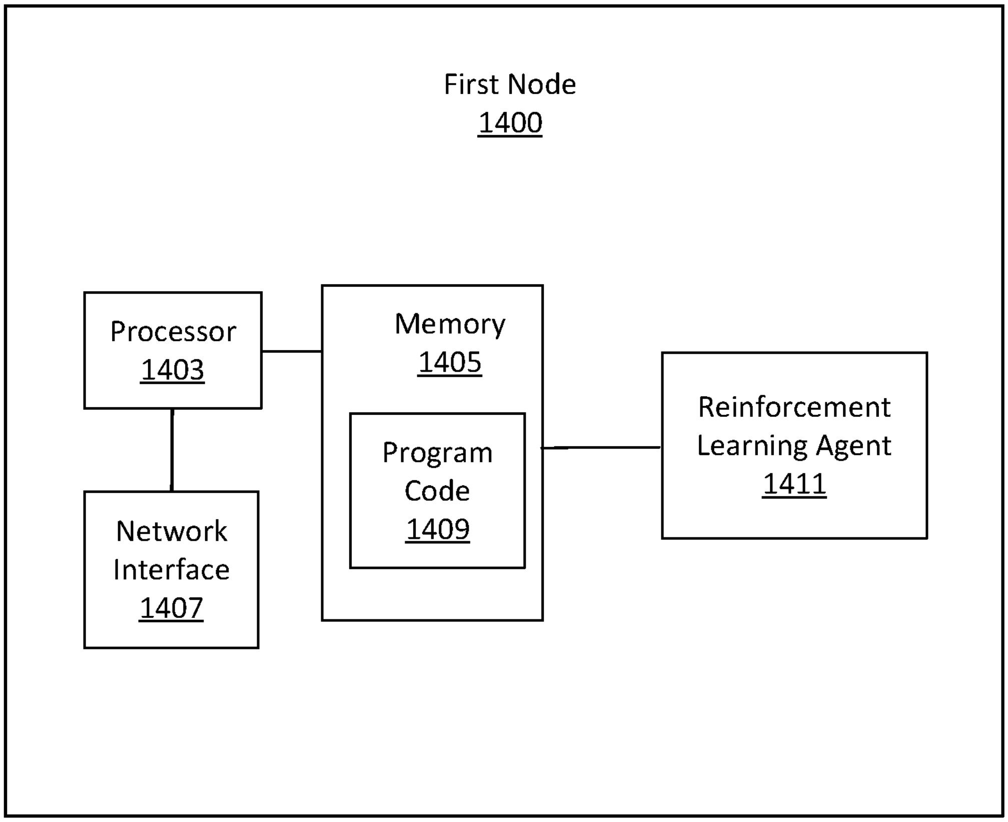
FIG. 14 is a block diagram illustrating a first node (e.g., a leaf node, a pine node, a super spine node) in accordance with some embodiments of the present disclosure.

FIG. 14 is a block diagram illustrating elements of a first node 1400 (also referred to as a leaf node, a spine node, a super spine node, or other node of/for a fat tree network) according to embodiments of inventive concepts. (First node 1400 may be provided, for example, as discussed below with respect to leaf node 103, spine node 1005, and/or super spine node 107 and/or virtual machine as discussed further herein, all of which should be considered interchangeable in the examples and embodiments described herein and be within the intended scope of this disclosure, unless otherwise noted.) As shown, the first node may include network interface circuitry 1407 (also referred to as a network interface) configured to provide communications with other nodes (e.g., with other leaf nodes, spine nodes, and/or super spine nodes) of the fat tree network. The first node may also include processing circuitry 1403 (also referred to as a processor) coupled to the network interface 1407, and optionally, may include memory circuitry 1405 (also referred to as memory) coupled to the processing circuitry. The memory circuitry 1405 may include computer readable program code 1409 that when executed by the processing circuitry 1403 causes the processing circuitry to perform operations according to embodiments disclosed herein. According to other embodiments, processing circuitry 1403 may be defined to include memory so that a separate memory circuitry is not required. The first node may also include RL agent 1411.

As discussed herein, operations of the network node according to some embodiments may be performed by processing circuitry 1403, network interface 1407, optional memory (as discussed herein), and/or RL agent 1411 (e.g., operations discussed herein with respect to example embodiments relating to first nodes). For example, processing circuitry 1403 and/or RL agent 1411 may control network interface 1407 to signal communications through network interface 1407 to one or more other nodes, controllers, and/or simulation nodes and/or to receive uplink communications through network interface 1407 from one or more other nodes, controllers, and/or simulation nodes. According to some embodiments, first node 1400 and/or an element(s)/function(s) thereof may be embodied as a virtual node/nodes and/or a virtual machine/machines.

In the description that follows, while the first node may be any of a leaf node, a spine node, a super spine node, a virtual node, or a virtual machine, the first node 1400 shall be used to describe the functionality of the operations of the first node. Operations of a first node 1400 (implemented using the structure of the block diagram of FIG. 14) will now be discussed with reference to the flow charts of FIGS. 15 and 16 according to some embodiments of inventive concepts. For example, processing circuitry 1403 and/or RL agent 1411 performs respective operations of the flow charts.

Figure 15:
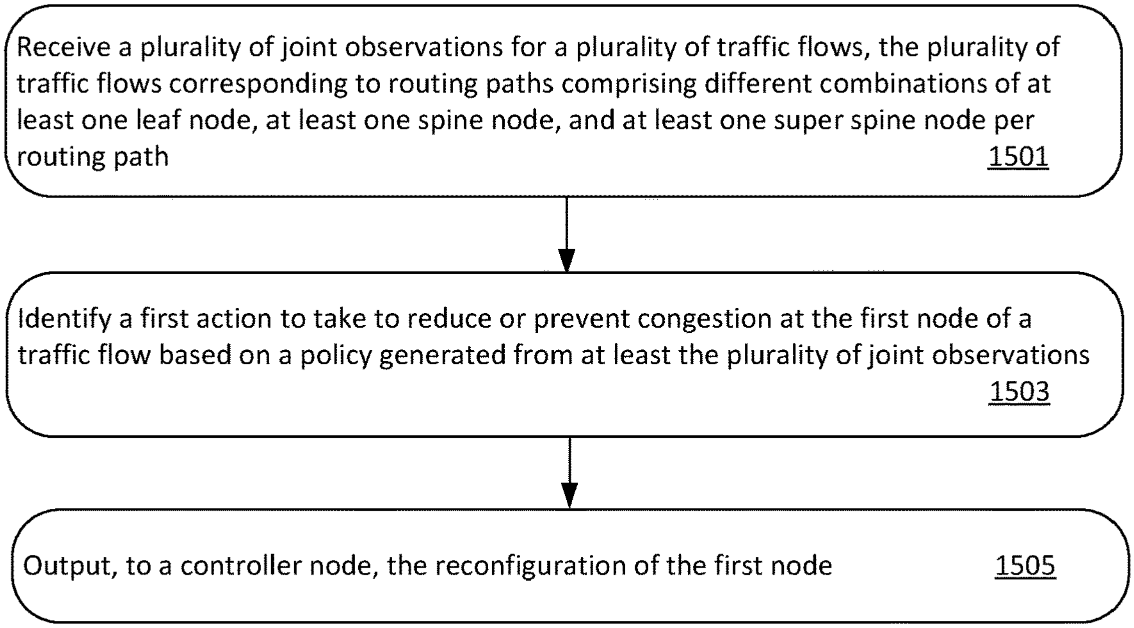
FIGS. 15 and 16 are flow charts illustrating operations of a first node according to some embodiments of the present disclosure.

Referring first to FIG. 15, a method is provided that is performed by a first node (103, 105, 107, 1400) of a fat tree network for management of a plurality of traffic flows in the fat tree network having differentiated service requirements. The method includes receiving (1501), from a simulation model or a testbed environment, a plurality of joint observations for the plurality of traffic flows. The plurality of traffic flows correspond to a plurality of routing paths comprising different combinations of at least one leaf node, at least one spine node, and at least one super spine node of the fat tree network per routing path. The method further includes identifying (1503), with a first reinforcement learning model for the first node, a first action to take to reduce or prevent congestion at the first node of a traffic flow based on a policy generated from at least the plurality of joint observations. The first action comprises a reconfiguration of the first node for an identified routing path. The method further includes outputting (1505), to a controller node, the reconfiguration of the first node.

In some embodiments, the plurality of traffic flows comprise an elephant flow and a mouse flow. The elephant flow and the mouse flow comprise respective traffic flows having different arrival rates, different priorities, and different traffic types.

In some embodiments, the plurality of joint observations comprise at least one of a latency per traffic flow and a throughput per traffic flow.

Figure 16:
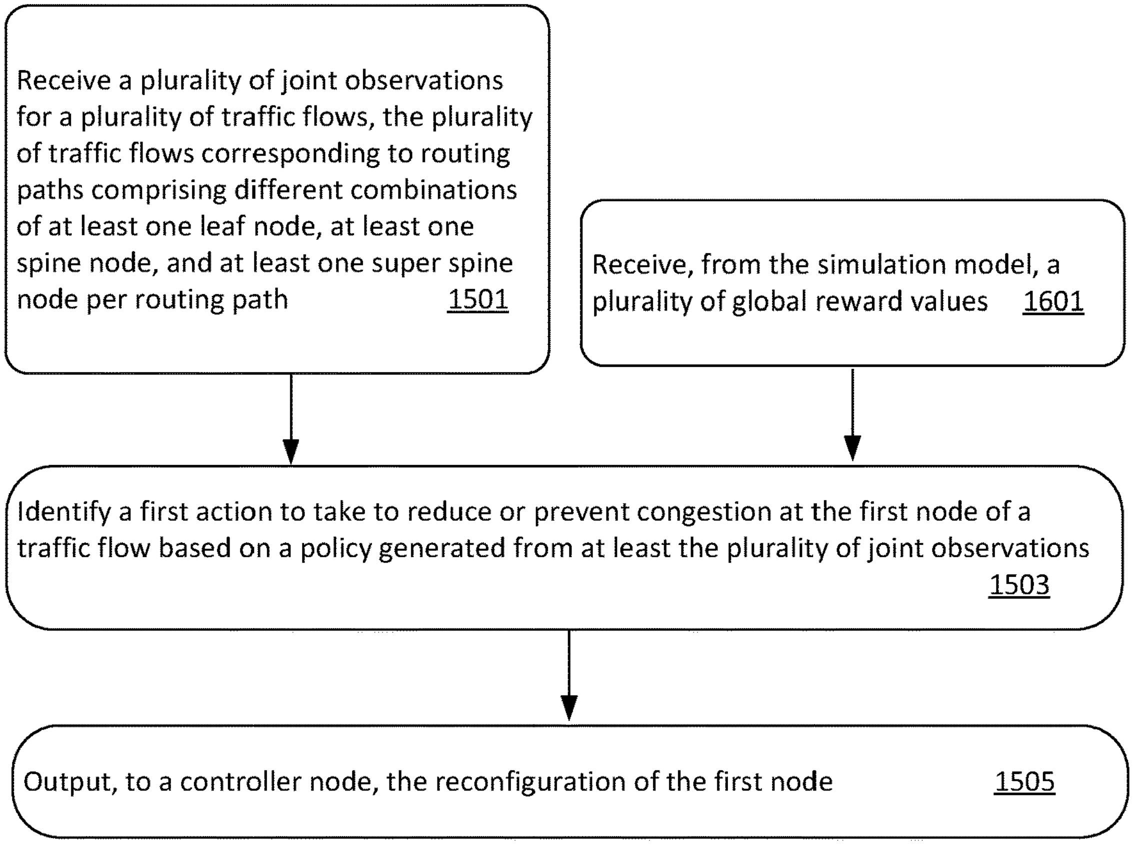

Referring now to FIG. 16, in some embodiments, the method further includes, receiving (1601), from the simulation model or the testbed environment, a plurality of global reward values. A global reward value indicates a measure of a joint state of the nodes in the fat tree network in a routing path comprising a combination of the at least one leaf node, the at least one spine node, and the at least one super spine node. The joint state results from an action of at least one reinforcement learning agent in the fat tree network for the routing path.

In some embodiments, the joint state comprises a utilization metric per the at least one leaf node, the at least one spine node, and the at least one super spine node for the routing path.

In some embodiments, the global reward value comprises at least one of (i) a positive value when the routing path meets a service level agreement, SLA, target for a defined priority level of service for the fat tree network, (ii) a positive value when the routing path is energy efficient based on a reduction in a number of active nodes in the routing path, and (iii) a positive value when the routing path is within a defined fault tolerance for the traffic flow.

In some embodiments, the policy comprises a proposed reconfiguration of the first node by the reinforcement learning agent per state in a set of states and an observation per state that maximizes a reward value to the reinforcement learning agent. The observation comprises at least one of (i) a per traffic flow throughput increase or decrease at the first node, (ii) an amount of time a packet per traffic flow spent at the first node, (iii) an increase or a decrease of packet delay per traffic flow at the first node, (iv) a per traffic flow packet drop increase or packet drop decrease at the first node, (v) a retransmission at the first node, (vi) an outage of a link to the first node in the fat tree network, and (vii) a reliability of the first node.

In some embodiments, the reconfiguration of the first node comprises at least one of a first reconfiguration to a load balance the traffic flow at the first node, a second configuration to a shape the traffic flow at the first node, and a third configuration to a prioritize the traffic flow at the first node.

In some embodiments, the reconfiguration comprises performance of at least one of (i) an equal cost multi-path routing load balancing, (ii) a priority queue scheduling at the first node, (iii) a first in first out, FIFO, queue scheduling at the first node, (iv) dropping a packet according to a defined metric at the first node, and (v) limiting a processing rate of a traffic flow at the first node.

In some embodiments, when the first node comprises a super spine node or a spine node, the reconfiguration further comprises diverting the traffic flow to a node in the routing path having lower utilization than the super spine node or the spine node based on an adaptive change to a weight assigned to the super spine node or the spine node.

In some embodiments, when the first node comprises a leaf node, the reconfiguration further comprises limiting a committed information rate, CIR, and/or a peak information rate, PIR, per traffic flow.

In some embodiments, the reward value indicates a measure of the state of the first node resulting from the proposed action.

In some embodiments, the reward value comprises at least one of a positive value for a reduced packet drop or latency per traffic flow, a positive value for an improved throughput, a positive value for not crossing a defined utilization metric of the first node, and a combination of the global reward values.

In some embodiments, when the first node comprises a spine node, the reward value further comprises a negative value for an outage of a link to the spine node in the fat tree network.

In some embodiments, the plurality of reinforcement learning agents comprise decentralized partially observable Markov Decision Process, Dec-POMDP, agents.

In some embodiments, the simulation model or test bed environment receives the plurality of traffic flows and a plurality of configurations per reinforcement learning agent serving the at least one leaf node, the at least one spine node, and the at least one super spine node.

In some embodiments, the simulation model or testbed environment evaluates an impact per traffic flow from simulating a configuration from a plurality of configurations of the at least one of the leaf node, the at least one spine node, and the at least one super spine node per routing path.

The operations of block 1601 from the flow chart of FIG. 16 may be optional with respect to some embodiments of a method performed by a first node.

Figure 17:
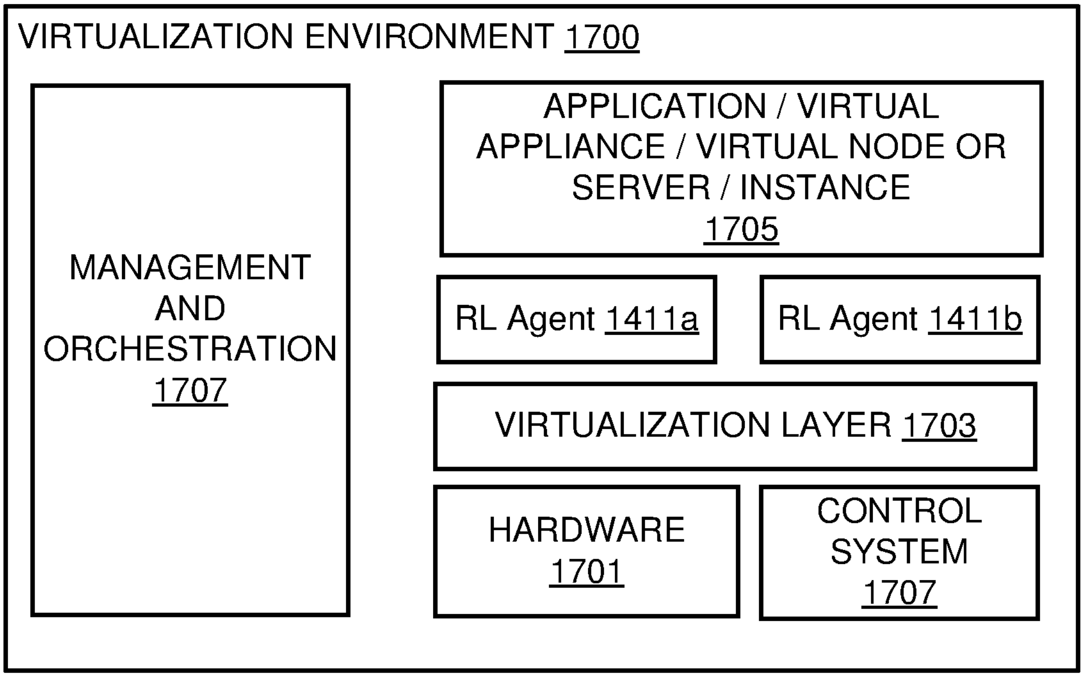
FIG. 17 is a block diagram of a virtualization environment in accordance with some embodiments of the present disclosure.

FIG. 17 is a block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1700 hosted by one or more of hardware nodes, such as a hardware computing device that operates as a first node (e.g., a leaf node, a spine node, and/or a super spine node).

RL agents 1411*a* and 1411*b* (which may alternatively be called software instances, virtual appliances, network functions, virtual nodes, virtual network functions, etc.) are run in the virtualization environment to implement some of the features, functions, and/or benefits of some of the embodiments disclosed herein.

Hardware 1701 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1703 (also referred to as hypervisors or virtual machine monitors (VMMs)), provide RL agents 1411*a* and/or 1411*b* (one or more of which may be generally referred to as RL agents 1411), and/or perform any of the functions, features and/or benefits described in relation with some embodiments described herein. The virtualization layer 1703 may present a virtual operating platform that appears like networking hardware to the RL agents 1411.

The RL agents 1411 comprise virtual processing, virtual memory, virtual networking or interface and virtual storage, and may be run by a corresponding virtualization layer 1703. Different embodiments of the instance of a virtual appliance 1705 may be implemented on one or more of RL agents 1411, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a RL agents 1411 may be a software implementation of a physical machine that runs programs as if they were executing on a physical, non-virtualized machine. Each of the RL agents 1411, and that part of hardware 1701 that executes that RL agent, be it hardware dedicated to that RL agent and/or hardware shared by that RL agent with others of the RL agents, forms separate virtual network elements. Still in the context of NFV, a virtual network function is responsible for handling specific network functions that run in one or more RL agents 1411 on top of the hardware 1701 and corresponds to the application 1705.

Hardware 1701 may be implemented in a standalone network node with generic or specific components. Hardware 1701 may implement some functions via virtualization. Alternatively, hardware 1701 may be part of a larger cluster of hardware (e.g. such as in a data center) where many hardware nodes work together and are managed via management and orchestration 1707, which, among others, oversees lifecycle management of applications 1705. In some embodiments, hardware 1701 is coupled to one or more nodes of a fat tree network. Nodes may communicate directly with other hardware nodes via one or more appropriate network interfaces and may be used in combination with the virtual components to provide a virtual node with capabilities of embodiments of first node discussed herein.

In some embodiments, some signaling can be provided with the use of a control system 1707.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed by a first node of a fat tree network for management of a plurality of traffic flows in the fat tree network having differentiated service requirements, the method comprising:

receiving, from a simulation model or a testbed environment, a plurality of joint observations for the plurality of traffic flows, the plurality of traffic flows corresponding to a plurality of routing paths comprising different combinations of at least one leaf node, at least one spine node, and at least one super spine node of the fat tree network per routing path;

identifying, with a first reinforcement learning model for the first node, a first action to take to reduce or prevent congestion at the first node of a traffic flow based on a policy generated from at least the plurality of joint observations, the first action comprising a reconfiguration of the first node for an identified routing path; and outputting, to a controller node, the reconfiguration of the first node.

2. The method of claim 1, wherein the plurality of traffic flows comprise an elephant flow and a mouse flow, the elephant flow and the mouse flow comprising respective traffic flows having different arrival rates, different priorities, and different traffic types.

3. The method of claim 1, wherein the plurality of joint observations comprise at least one of a latency per traffic flow and a throughput per traffic flow.

4. The method of claim 1, further comprising:

receiving, from the simulation model or the testbed environment, a plurality of global reward values, wherein a global reward value indicates a measure of a joint state of the nodes in the fat tree network in a routing path comprising a combination of the at least one leaf node, the at least one spine node, and the at least one super spine node, the joint state resulting from an action of at least one reinforcement learning agent in the fat tree network for the routing path.

5. The method of claim 4, wherein the joint state comprises a utilization metric per the at least one leaf node, the at least one spine node, and the at least one super spine node for the routing path.

6. The method of claim 4, wherein the global reward value comprises at least one of (i) a positive value when the routing path meets a service level agreement (SLA), target for a defined priority level of service for the fat tree network, (ii) a positive value when the routing path is energy efficient based on a reduction in a number of active nodes in the routing path, and (iii) a positive value when the routing path is within a defined fault tolerance for the traffic flow.

7. The method of claim 1, wherein the policy comprises a proposed reconfiguration of the first node by the reinforcement learning agent per state in a set of states and an observation per state that maximizes a reward value to the reinforcement learning agent, and wherein the observation comprises at least one of (i) a per traffic flow throughput increase or decrease at the first node, (ii) an amount of time a packet per traffic flow spent at the first node, (iii) an increase or a decrease of packet delay per traffic flow at the first node, (iv) a per traffic flow packet drop increase or packet drop decrease at the first node, (v) a retransmission at the first node, (vi) an outage of a link to the first node in the fat tree network, and (vii) a reliability of the first node.

8. The method of claim 1, wherein the reconfiguration of the first node comprises at least one of a first reconfiguration to a load balance the traffic flow at the first node, a second configuration to a shape the traffic flow at the first node, and a third configuration to a prioritize the traffic flow at the first node.

9. The method of claim 8, wherein the reconfiguration comprises performance of at least one of (i) an equal cost multi-path routing load balancing, (ii) a priority queue scheduling at the first node, (iii) a first in first out (FIFO) queue scheduling at the first node, (iv) dropping a packet according to a defined metric at the first node, and (v) limiting a processing rate of a traffic flow at the first node.

10. The method of claim 9, wherein when the first node comprises a super spine node or a spine node, the reconfiguration further comprises diverting the traffic flow to a node in the routing path having lower utilization than the super spine node or the spine node based on an adaptive change to a weight assigned to the super spine node or the spine node.

11. The method of claim 9, wherein when the first node comprises a leaf node, the reconfiguration further comprises limiting a committed information rate (CIR) and/or a peak information rate (PIR) per traffic flow.

12. The method of claim 7, wherein the reward value indicates a measure of the state of the first node resulting from the proposed action.

13. The method of claim 12, wherein the reward value comprises at least one of a positive value for a reduced packet drop or latency per traffic flow, a positive value for an improved throughput, a positive value for not crossing a defined utilization metric of the first node, and a combination of the global reward values.

14. The method of claim 12, wherein when the first node comprises a spine node, the reward value further comprises a negative value for an outage of a link to the spine node in the fat tree network.

15. The method of claim 1, wherein the plurality of reinforcement learning agents comprise decentralized partially observable Markov Decision Process (Dec-POMDP) agents.

16. The method of claim 1, wherein the simulation model or test bed environment receives the plurality of traffic flows and a plurality of configurations per reinforcement learning agent serving the at least one leaf node, the at least one spine node, and the at least one super spine node.

17. The method of claim 1, wherein the simulation model or testbed environment evaluates an impact per traffic flow from simulating a configuration from a plurality of configurations of the at least one of the leaf node, the at least one spine node, and the at least one super spine node per routing path.

18. A first node of a fat tree network for management of a plurality of traffic flows in the fat tree network having differentiated service requirements, the first node comprising:

at least one processor;

at least one memory connected to the at least one processor and storing program code that is executed by the at least one processor to perform operations comprising:

receive, from a simulation model or a testbed environment, a plurality of joint observations for the plurality of traffic flows, the plurality of traffic flows corresponding to a plurality of routing paths comprising different combinations of at least one leaf node, at least one spine node, and at least one super spine node of the fat tree network per routing path;

identify, with a first reinforcement learning model for the first node, a first action to take to reduce or prevent congestion at the first node of a traffic flow based on a policy generated from at least the plurality of joint observations, the first action comprising a reconfiguration of the first node for an identified routing path; and output, to a controller node, the reconfiguration of the first node.

19. A non-transitory computer-readable storage medium storing a computer program comprising program code to be executed by processing circuitry of a first node of a fat tree network for management of a plurality of traffic flows in the fat tree network having differentiated service requirements, whereby execution of the program code causes the first node to perform operations comprising:

receive, from a simulation model or a testbed environment, a plurality of joint observations for the plurality of traffic flows, the plurality of traffic flows corresponding to a plurality of routing paths comprising different combinations of at least one leaf node, at least one spine node, and at least one super spine node of the fat tree network per routing path;

identify, with a first reinforcement learning model for the first node, a first action to take to reduce or prevent congestion at the first node of a traffic flow based on a policy generated from at least the plurality of joint observations, the first action comprising a reconfiguration of the first node for an identified routing path; and output, to a controller node, the reconfiguration of the first node.

* * * * *